US009869854B2

(12) United States Patent
Yamamoto

(10) Patent No.: US 9,869,854 B2
(45) Date of Patent: Jan. 16, 2018

(54) ENDOSCOPIC SYSTEM

(71) Applicant: Canon U.S.A., Inc., Melville, NY (US)

(72) Inventor: Akira Yamamoto, Kamio (JP)

(73) Assignee: Canon U.S.A, Inc., Melville, NY (US)

( * ) Notice: Subject to any disclaimer, the term of this patent is extended or adjusted under 35 U.S.C. 154(b) by 116 days.

(21) Appl. No.: 14/971,127

(22) Filed: Dec. 16, 2015

(65) Prior Publication Data

US 2017/0176736 A1    Jun. 22, 2017

(51) Int. Cl.
  *G02B 23/24* (2006.01)
  *G02B 7/02* (2006.01)

(52) U.S. Cl.
  CPC ......... *G02B 23/2476* (2013.01); *G02B 7/021* (2013.01); *G02B 7/025* (2013.01); *G02B 23/243* (2013.01); *G02B 23/2469* (2013.01)

(58) Field of Classification Search
  CPC .... G02B 23/2476; G02B 7/021; G02B 7/025; G02B 23/243; G02B 23/2469; G02B 23/26; G02B 23/2415; G02B 23/2461; G02B 23/2407; G02B 23/24; G02B 23/2438
  See application file for complete search history.

(56) References Cited

U.S. PATENT DOCUMENTS

| | | | |
|---|---|---|---|
| 3,976,360 A | 8/1976 | Schroder | |
| 4,074,306 A | 2/1978 | Kakinuma et al. | |
| 4,264,127 A | 4/1981 | Schumacher et al. | |
| 4,841,952 A * | 6/1989 | Sato | A61B 1/0051 600/129 |
| 5,565,983 A | 10/1996 | Barnard | |
| 5,980,454 A | 11/1999 | Broome | |
| 6,016,440 A | 1/2000 | Simon et al. | |
| 6,341,036 B1 | 1/2002 | Tearney et al. | |
| 6,858,859 B2 | 4/2002 | Kusunose | |
| 6,476,851 B1 | 11/2002 | Nakamura | |
| 6,485,413 B1 | 11/2002 | Boppart et al. | |
| 6,661,513 B1 | 12/2003 | Granger | |

(Continued)

FOREIGN PATENT DOCUMENTS

| | | |
|---|---|---|
| CN | 202568187 U | 12/2012 |
| JP | 7-191267 A | 7/1995 |

(Continued)

OTHER PUBLICATIONS

Zeidan, A et al. "Miniature forward-viewing spectrally encoded endoscopic probe", Optics Letters, Aug. 15, 2014, pp. 4871-4874, vol. 39, Issue 16.

(Continued)

*Primary Examiner* — Bao Q Truong
(74) *Attorney, Agent, or Firm* — Canon U.S.A, Inc. IP Division

(57) ABSTRACT

This disclosure an optical unit having a plurality of structural elements such as lens and a spacer having two or more opposing surfaces of the plurality of structural elements are bonded and secured to each other. A contact portion of the bonding portion is configured to prevent spreading of an adhesive and an adhesive reservoir is provided at the bonding portion. This disclosure further provides an apparatus having an imaging optical system configured to image a side surface in a tubular passage and an illuminating optical system that is arranged centrally within the imaging optical system.

14 Claims, 14 Drawing Sheets

(56) References Cited

U.S. PATENT DOCUMENTS

| | | |
|---|---|---|
| 6,831,781 B2 | 12/2004 | Tearney et al. |
| 6,970,736 B2 | 11/2005 | Komachi et al. |
| 7,003,196 B2 | 2/2006 | Ghiron |
| 7,110,124 B2 | 9/2006 | Jensen et al. |
| 7,160,248 B2 | 1/2007 | Alekseenko et al. |
| 7,189,226 B2 | 3/2007 | Auld et al. |
| 8,780,176 B2 | 8/2009 | Yelin |
| 7,796,270 B2 | 9/2010 | Yelin et al. |
| 7,843,572 B2 | 11/2010 | Tearney et al. |
| 7,859,679 B2 | 12/2010 | Bouma et al. |
| 7,929,219 B2 | 4/2011 | Togino |
| 8,045,177 B2 | 10/2011 | Tearney et al. |
| 8,130,454 B2 * | 3/2012 | Noguchi ............ G02B 23/2438 359/656 |
| 8,145,018 B2 | 3/2012 | Shishkov et al. |
| 8,203,708 B2 | 6/2012 | Lee et al. |
| 8,254,038 B2 * | 8/2012 | Togino ............... A61B 1/00096 359/725 |
| 8,289,522 B2 | 10/2012 | Tearney et al. |
| 8,317,688 B2 | 11/2012 | Glozman et al. |
| 8,506,478 B2 | 8/2013 | Mizuyoshi |
| 8,804,133 B2 | 8/2014 | Yelin et al. |
| 8,812,087 B2 | 8/2014 | Yelin et al. |
| 8,818,149 B2 | 8/2014 | Shishkov et al. |
| 8,838,213 B2 | 9/2014 | Tearney et al. |
| 9,254,089 B2 | 2/2016 | Tearney et al. |
| 2002/0114566 A1 | 8/2002 | Fairchild et al. |
| 2002/0145815 A1 | 10/2002 | Moriyama et al. |
| 2003/0142934 A1 | 7/2003 | Pan et al. |
| 2004/0147810 A1 | 7/2004 | Mizuno |
| 2005/0155704 A1 | 7/2005 | Yokajty et al. |
| 2007/0188855 A1 | 8/2007 | Shishkov et al. |
| 2007/0233396 A1 | 10/2007 | Tearney et al. |
| 2008/0013960 A1 | 1/2008 | Tearney et al. |
| 2008/0097225 A1 | 4/2008 | Tearney et al. |
| 2008/0221388 A1 | 9/2008 | Seibel et al. |
| 2008/0294002 A1 | 11/2008 | Xie |
| 2009/0141360 A1 | 6/2009 | Koyama |
| 2010/0210937 A1 | 8/2010 | Tearney et al. |
| 2011/0237892 A1 | 9/2011 | Tearney et al. |
| 2011/0275899 A1 | 11/2011 | Tearney et al. |
| 2012/0112094 A1 | 5/2012 | Kao et al. |
| 2013/0012771 A1 | 1/2013 | Robertson |
| 2013/0324858 A1 | 12/2013 | Xu et al. |
| 2014/0285878 A1 | 9/2014 | Escuti et al. |
| 2014/0378846 A1 | 12/2014 | Hosoda et al. |
| 2015/0045622 A1 | 2/2015 | Shishkov et al. |

FOREIGN PATENT DOCUMENTS

| | | |
|---|---|---|
| JP | 2008-309859 A | 12/2008 |
| JP | 2009-251249 A | 10/2009 |
| JP | 2010051606 A | 3/2010 |
| JP | 2011-17824 A | 1/2011 |
| JP | 2011-48086 A | 3/2011 |
| JP | 2011-095337 A | 5/2011 |
| JP | 2011-099900 A | 5/2011 |
| WO | 2014031748 A1 | 2/2014 |
| WO | 2014104405 A1 | 7/2014 |
| WO | 2015116939 A1 | 8/2015 |
| WO | 2015116974 A1 | 8/2015 |

OTHER PUBLICATIONS

Pitris, C. et al., ("A GRISM-based probe for spectrally encoded confocal microscopy" Optics Express, Jan. 27, 2003, pp. 120-124, vol. 11, No. 2.

Yelin, D., et al., "Three-dimensional miniature endoscopy", Nature, Oct. 19, 2006, p. 765, vol. 443.

Kang, D., et al., "Spectrally-encoded color imaging", Optics Express, Aug. 17, 2009, pp. 15239-15247, vol. 17, No. 17.

Yun, et al., "High-speed spectral-domain optical coherence tomography at 1.3 μm wavelength", Opt Express, Dec. 29, 2003, pp. 3598-3604, No. 11, vol. 26.

* cited by examiner

ENDOSCOPIC SYSTEM

BACKGROUND OF THE INVENTION

Field of the Invention

The present invention relates to an optical system, and more specifically, to an endoscope applicable to medical and industrial usages.

Description of the Related Art

Optical systems (e.g., endoscopes) include medical endoscopes used for observing, diagnosing, and treating internal organs, and industrial endoscopes used for observation or repair of places in a mechanical apparatus or equipment, which are difficult to observe, such as interiors of pipes or gaps between instruments. These optical systems typically have a thickness from several mm to more than ten mm, and are configured to acquire images from a front to oblique directions of the endoscope by a wide angle optical system. In contrast, a configuration in which an image of a side surface of a void passage is acquired as disclosed in Japanese Patent Laid-Open No. 2008-309859 is known. The endoscopes of this type are capable of imaging an inner wall of the void passage located on a side surface of the endoscope.

However, when observing an inner wall in a thin tube, the endoscope by itself needs to be very thin. This requires a reduction in entire diameter including not only an observation optical system, but also an illuminating system that may be included in a lens barrel. However, the optical system disclosed in Japanese Patent Laid-Open No. 2008-309859 has a large diameter, and is not suitable for the endoscope as described above. Optical systems disclosed in Japanese Patent Laid-Open No. 2011-48086 and Japanese Patent Laid-Open No. 2011-17824 are allowed to reduce the diameter of the observation optical system by itself. However, a separate illuminating system is required, and hence there still remains a problem in reduction in diameter of the entire endoscope. Furthermore, since the separate illuminating system is required, the number of components is increased.

Due to the small sizes required, lens barrels of endoscopes cannot be easily processed with high form precisions like those of lens barrels of microscopes. In many cases, optical systems (endoscopes) are accommodated in cylindrical lens barrels and lenses are held by being positioned at a spacer. Japanese Patent Laid-Open No. 7-191267 discloses an exemplary endoscope in which lenses are positioned at a spacer and the lenses are bonded to and held by a cylindrical lens barrel.

However, when, as in Japanese Patent Laid-Open No. 7-191267, an optical system is held by a lens barrel, a space whose size equals the sum of the outside diameter of the optical system and the thickness of the lens barrel is required. Therefore, in applications in which diameters need to be reduced, the space for the lens barrel becomes an obstacle to reducing diameters.

In contrast, if an optical system is one in which lenses are held by being connected to a spacer without using a lens barrel, the space for the lens barrel is not required, so that such an optical system is suitable for reducing diameters. The lenses may be connected to the spacer by using a method that is often used for securing lenses to a lens barrel, that is, a method for bonding a peripheral portion of an optical surface to a spacer.

In performing the aforementioned bonding of the lenses, since, in an optical system having a small diameter, such as an endoscope, the lenses and the spacer are small, the amount of application of an adhesive is required to be very small. If the adhesive is accidentally applied by an amount that exceeds a prescribed amount, the adhesive protrudes outwardly from the lenses and may become an obstacle to reducing diameters. In addition, the protruded adhesive contacts members disposed at outer sides of the lenses and may cause undesired bonding to occur.

Thus, there is a need for new optical systems that can provide for observation of the side surfaces in a tubular passage as well as optical systems that can be manufactured having the small diameter required for these optical systems.

SUMMARY OF THE INVENTION

The present invention provides an optical system in which protrusion of an adhesive is prevented from occurring.

This disclosure further provides an endoscope comprising: an imaging optical system configured to observe a side surface in a tubular passage comprising an imaging optical system and an illuminating optical system configured to transmit illuminating light for illuminating a portion to be observed, wherein the illuminating optical system is arranged at a center of the imaging plane of the imaging optical system and includes at least one reflecting element configured to direct transmitted illuminating light toward a side surface of the tubular passage. In some embodiments, the imaging optical system includes at least two optical groups, one with positive and one with negative refracting power, where the optical group having negative refracting power includes an optical device with at least two rotational symmetry reflecting surfaces and one transmitting surface interposed between the two reflecting surfaces. In use, an illuminating light emitted from an illumination fiber passes through a center of the preferably ring-shaped reflecting surface and is deflected to the tubular passage side surface by the reflecting element of the imaging optical system, which is arranged on the side opposite to the imaging plane.

By arranging the illuminating system at the center of the observation optical system, the diameter of the entire optical system may be reduced, so that a reduction in diameter and size of the endoscope is achieved. By arranging the illuminating system at the center of an image transmitting fiber, the number of components may be reduced.

Further features of the present invention will become apparent from the following description of exemplary embodiments with reference to the attached drawings.

DESCRIPTION OF THE EMBODIMENT

First Embodiment

Figure 1:
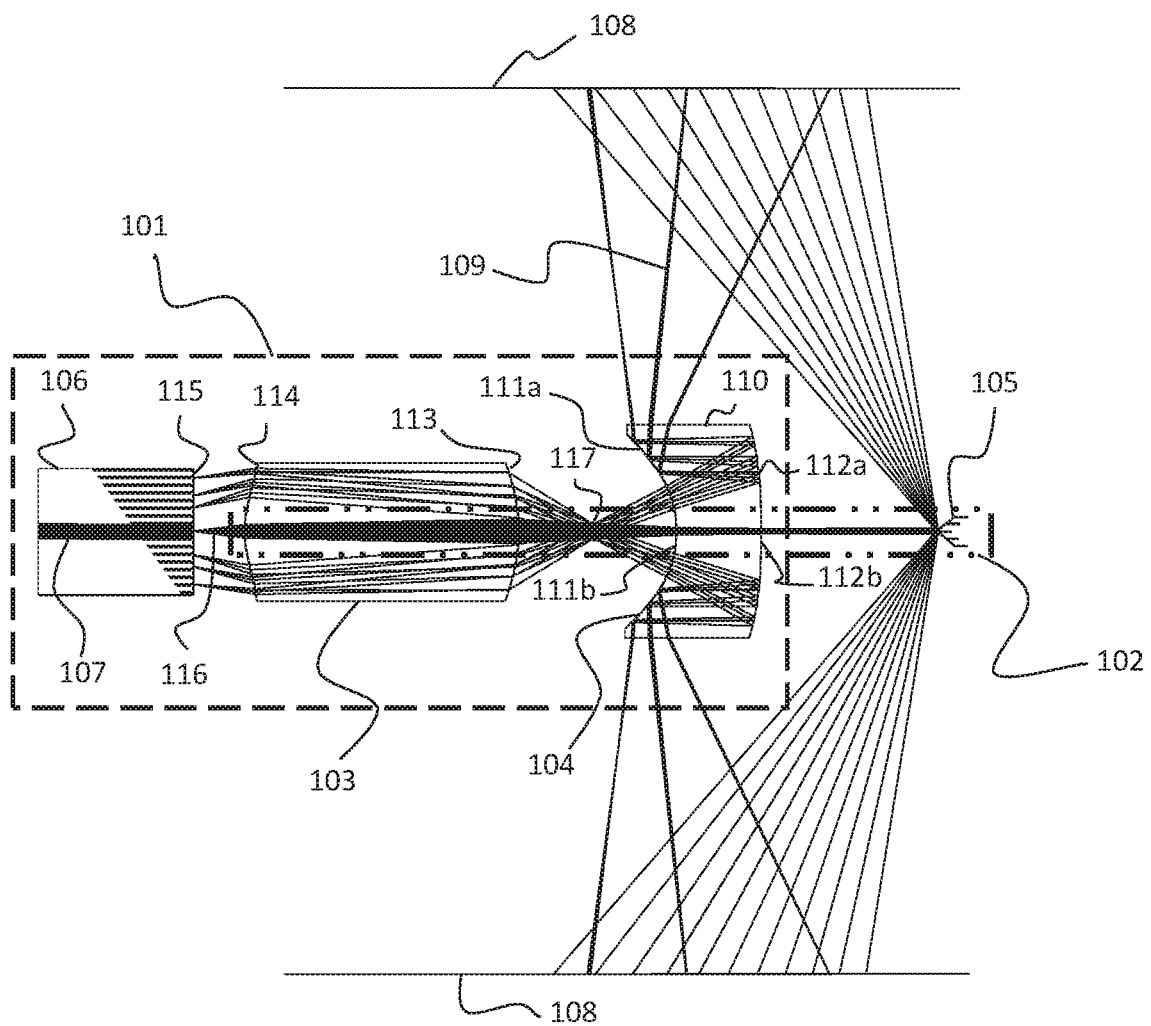
FIG. 1 is an explanatory drawing illustrating a first example of the invention.

Referring now to FIG. 1, a first embodiment of the invention will be described. FIG. 1 is a cross-sectional view of an optical system used in the first embodiment. The optical system includes two components, namely, an imaging optical system 101 and an illumination optical system 102, and the imaging optical system 101 and the illumination optical system 102 are partly shared. The imaging optical system 101 includes two parts, namely, a lens 103 and an optical device 104. The illumination optical system 102 includes the lens 103, the optical device 104, and a reflecting surface 105.

An optical flux 116 emitted from an illumination fiber 107 located at a center of a fiber bundle 106 passes through the lens 103 and the optical device 104, and is reflected by the reflecting surface 105 toward the side surface of a tubular passage, which is the inner wall 108 of the tubular passage.

The tubular passage is, for example, a lumen such as a human aorta.

The reflecting surface 105 has an odd-order aspherical shape for illuminating a large circumference of the tubular passage inner wall 108. The system is designed such that at least 50%, 60%, 70% 80%, 90%, or more of the circumference of the tubular passage can be illuminated at one time.

Figure 2:
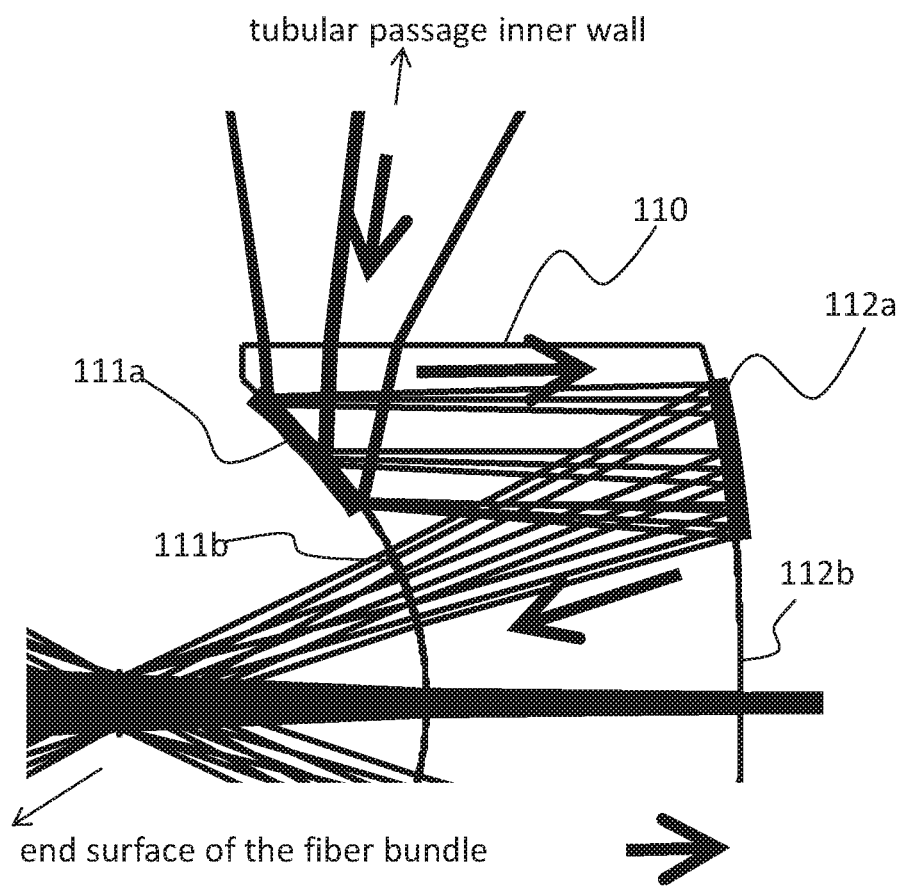
FIG. 2 is an enlarged view of an optical device of the first example.

An imaging process in which a reflected light from the tubular passage inner wall 108 form an image on an end surface of the fiber bundle 106 (the imaging plane) will be described with reference to FIG. 2. FIG. 2 is an enlarged view of a portion of the optical device 104 in FIG. 1. As indicated by the arrows, a reflected light 109 from the illuminated tubular passage inner wall 108 enters the first optical group 104 from the side surface 110 of the optical device 104. The side surface 110 acts as a transmitting surface, where light enters and then is reflected by a reflecting surface 111a and a reflecting surface 112a, and goes through a surface 111b. Subsequently, as shown in FIG. 1, the reflected light 109 passes through a second optical group which is shown as a lens 103, and forms an image on an end surface 115 of the fiber bundle 106. The side surface 110 has a cylindrical shape, and the optical device 104 has a rotational symmetric shape. In some embodiments, the first optical group that includes the optical device 104 has a negative refracting power and the second optical group 103 has a positive refracting power.

The reflecting surface 112a and the reflecting surface 111a may be made reflecting, for example, by using a reflective coating (e.g., an Al coating). The reflective coating may be formed by vapor-deposition of Al on a portion of the optical device 104 where the portion coated forms, for example, a ring-shape. The coating for forming the reflecting surface may be, for example, Al, a multilayer film, Ag, Au, etc. Coating material used may depend on the wavelength used and costs. Portions of the lens 103 and the optical device 104 in the vicinity of an optical axis are used as transmitting surfaces. Therefore, portions near the center of two optical devices (103, 104) are used as part of the illumination optical system and the ring-shaped areas in the periphery is used as a part of an imaging optical system.

Figure 3:
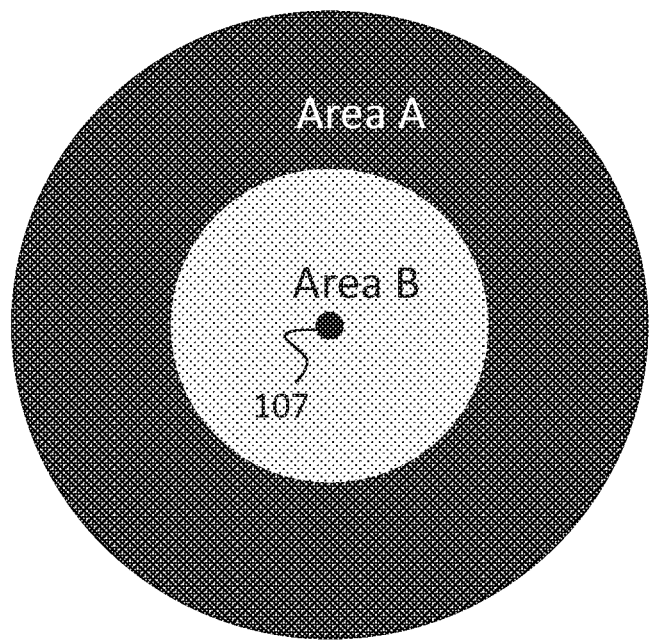
FIG. 3 is a drawing illustrating an image area in an end surface of a fiber bundle of the first example.

An image of at least a portion of the tubular passage wall surface is formed by the imaging optical system 101 on the end surface 115 of the fiber bundle 106. On the end surface 115, the image is formed at an imaging plane, where it is found only in the periphery (area A) of the end surface 115 as illustrated in FIG. 3. This is because the imaging optical system 101 is configured to use only the peripheral portions of the lens 103 and the optical device 104, and hence the optical flux from the tubular passage inner wall 108 does not reach an area B. Therefore, the center area (exemplified as area B in FIG. 3) of the fiber bundle 106 is an area which does not contribute to imaging. In practice, the image formed at the image plane is transversed, such as via an optical fiber bundle, to a detector where the image can be viewed, saved, and processed.

The illuminating optical system is arranged centrally within the imaging optical system. Thus, light for illuminating optical system passes through the center of an imaging plane on which images are formed in the imaging optical system (area B). Since the illuminating optical system passes through the center of the imaging optical system, image signal is not found at the center of the imaging plane.

The light either passes through the first and/or second optical groups or the first and/or second optical groups are designed with a passage through their center or core through which light for the illumination optical system can pass. By placing an illumination fiber at a center of this area, an arrangement of the illumination fiber in an area different from the fiber bundle 106 is no longer necessary, so that a reduction in diameter of the entire optical system can be achieved. By placing the illumination fiber 107 integrally with the fiber bundle 106, a reduction in number of components can also be achieved.

Figure 4:
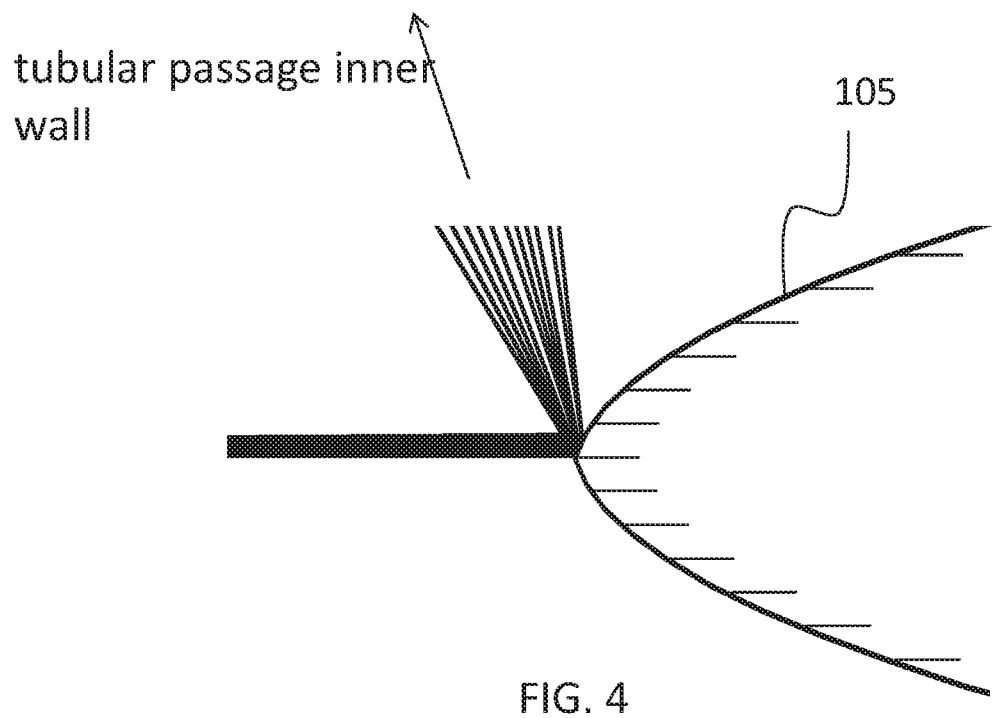
FIG. 4 is an enlarged view of a reflecting surface of the first example.

FIG. 4 is an enlarged view of the reflecting surface 105 of the reflecting element. The reflecting surface 105 illuminates the tubular passage inner wall 108 over a large angle. In this exemplary configuration, the reflecting element has an odd-order aspherical shape. In other embodiments, the reflecting element is, for example, a cone or a conical pyramid. As exemplified, the reflected light can be prevented from returning from the reflecting surface 105 to the illumination fiber 107, and efficient illumination of the tubular passage inner wall 108 is enabled.

In FIG. 1, when T represents the thickness of the lens 103 on the optical axis, and L represents the entire length of the optical system from a highest point of a surface 112b to the end surface 115 of the fiber, the equation $$0.2 < T/L < 0.8 \quad (1)$$

is satisfied in some particular embodiments. In this optical system, in order to reduce the entire length to some extent, the distances from a stop 117 to the lens 103 and the optical device 104 are short. Therefore, in order to secure a high field of view, an optical power of the lens surface 113 is limited. Since a resolution on the image collected from the tubular passage inner wall 108 needs to be secured in this state, the diameter of the stop 117 is determined, and accordingly, the beam diameter on the surface 113 is determined. In order to secure the beam diameter, the surface 113 needs to be positioned away from the fiber bundle end surface 115. The lens surface 114 is preferably positioned near the fiber bundle end surface 115 to correct the curvature of field. From the reasons described above, the value of T may be increased and, consequently, T/L preferably exceeds the lower limit of equation 1, (0.2).

In contrast, when the T/L exceeds the upper limit of 1(0.8), the thickness of the optical device 104 is reduced. Consequently, a configuration to allow the light beam to enter between the two reflecting surfaces cannot be employed, so that the range of observation on the tubular passage inner wall 108 can hardly be widened.

In some embodiments, the range of equation 1 preferably satisfies $$0.3 < T/L < 0.6 \quad (2)$$

In this manner, by sharing the center of the imaging optical system with the illumination optical system, the area which can be observed by the imaging optical system can be illuminated, so that the reduction in diameter of the entire endoscope is enabled. Simultaneously, by integrating the fiber bundle for transmitting the image and the fiber for illumination, the reduction in diameter of the image transmitting system.

Second Embodiment

Figure 5:
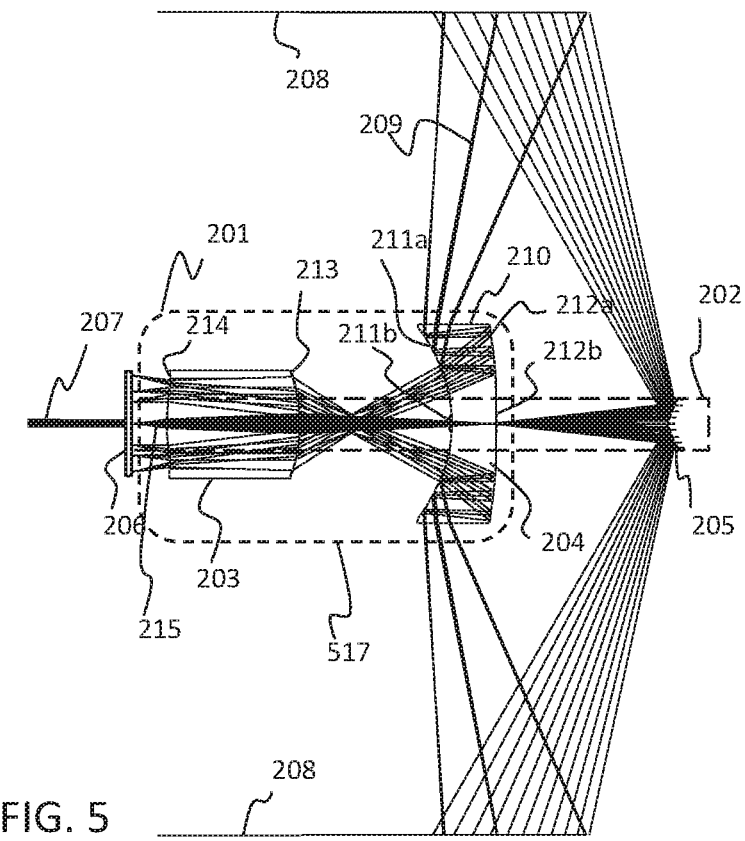
FIG. 5 is an explanatory drawing illustrating a second example of the invention.

Referring now to FIG. 5, Embodiment two of the invention will be described. In Embodiment two, an optical system in which part of the surface of the optical device shared in Embodiment one is provided with a different curvature, and is integrated is used. An imaging element is arranged at the image plane of the imaging optical system instead of the fiber bundle that is exemplified in Embodiment one.

In the same manner as Embodiment one, an optical flux 215 emitted from the illumination fiber 207 passes through surface 211b and 212b of a lens 203 and an optical device 204 and impinges a reflecting surface 205, and then is deflected to a tubular passage inner wall 208. An optical flux 209 reflected by the tubular passage inner wall 208 enters the optical device 204 from a side surface 210 of the optical device 204, is reflected by a reflecting surface 211a and then by a reflecting surface 212a. The optical flux 209 then passes through the surface 211a, and enters the rear lens 203. The optical flux 209 subsequently is collected by the lens 203, and forms an image on an imaging device 206.

Figure 6:
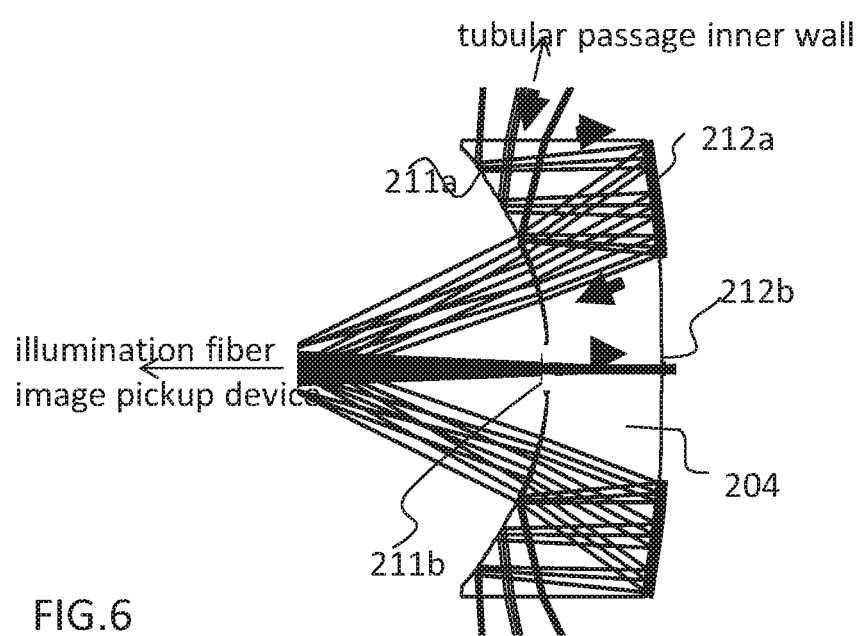
FIG. 6 is an enlarged view of an optical device of the second example.

The optical device 204 will be described with reference to FIG. 6. FIG. 6 is an enlarged view of the optical device 204. An optical flux from an illumination fiber (which is not illustrated) passes through a surface 211b, which is part of the optical device 204 formed near the center thereof, enters the device, and goes out from 212b. In other words, surfaces 211b and 212b constitute part of an illuminating optical system 202. In the same manner, an optical flux from the tubular passage inner wall (which is not illustrated) enters the optical device 204 from the side surface 210 of the optical device 204, reflects from the surfaces 211a, 212a, and goes out again from the surface 211a. In this exemplary embodiment, the surface 211b is a surface represented by a refractive index function that is different from that of the surface 211a. For example, in Embodiment two, the surface 211a has a negative optical power, while the surface 211b has a positive optical power. Since the surfaces 211a and 211b of the illuminating optical system are sufficiently separated from each other, the two distinct refractive indexes functions may be on the same plane. Since the surface 211a is used for both reflection and transmission, the optical flux entering from the surface 210 into the surface 211a satisfies conditions of total reflection. By using the total reflection in this manner, one surface can be used for reflection and transmission simultaneously, and a reduction in size of the optical device 204 is enabled.

Although the sides are composed of the surfaces 211a, 211b represented by different functions in Embodiment two, a surface 212 side may have the same characteristics. A configuration having a surface represented by different functions between the center and the periphery on both the surfaces 211 and 212 is also applicable to the present invention.

Figure 7:
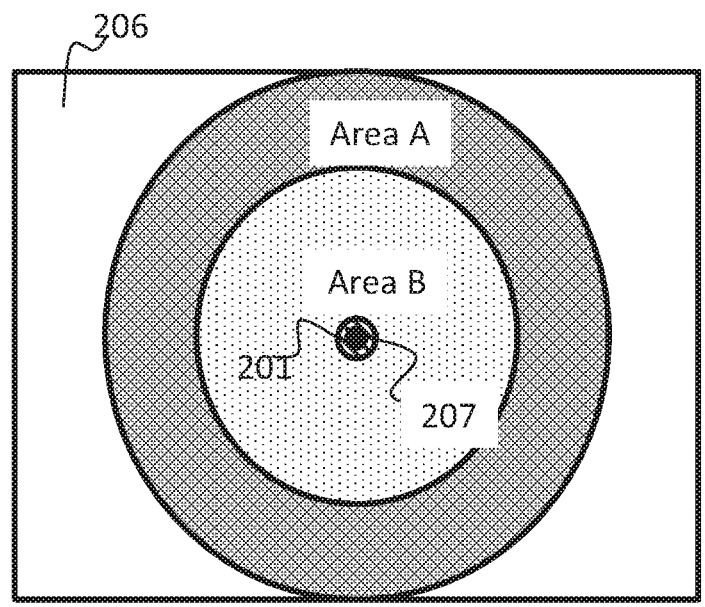
FIG. 7 is a drawing illustrating an image area on an imaging element of the second example.

In Embodiment two, an image formed by the imaging optical system 201 is transmitted to the outside by using the imaging device 206. The imaging element may include, for example, a CCD and/or a CMOS sensor. As illustrated in FIG. 7, an image is formed by the imaging optical system 201 only in the area A on the imaging device 206, and no image is formed in the area near the center (area B). Therefore, a hole 701 is formed at the center of the area B, and the illumination fiber 207 is inserted therein. In this configuration, the optical flux 209 from the illumination fiber 207 is allowed to pass through the center of the imaging optical system 201, so that the diameter of the entire optical system can be reduced.

Third Embodiment

Figure 8:
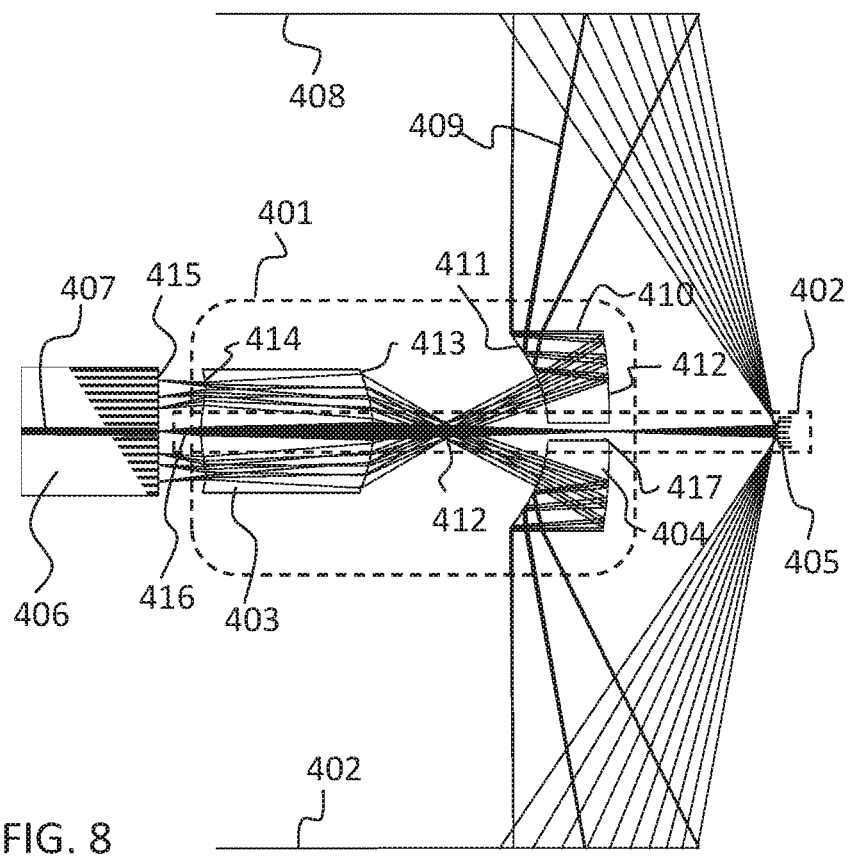
FIG. 8 is an explanatory drawing illustrating a third example of the invention.

Refereeing now to FIG. 8, Embodiment 3 of the invention will be described. Basic configurations for this exemplary embodiment are the same as Embodiment one and Embodiment two. However, in Embodiment 3, a hole is formed at a center of the optical device so as to allow the illuminating optical flux to pass therethrough.

In the same manner as Embodiment one, an optical flux 416 emitted from the illumination fiber 407 passes through a lens 403, passes through the hole 417 of the optical device 404, enters a reflecting surface 405 and deflected thereon, and is introduced into a tubular passage inner wall 408. An optical flux 409 reflected by the tubular passage inner wall 408 enters the optical device 404 from a side surface 410 of the optical device 404, is reflected by a reflecting surface 411 and a reflecting surface 414, is transmitted through the reflecting surface 411, and enters the rear lens 403. Subsequently, the optical flux 409 is collected by the lens 403, and forms an image on an end surface 415 of a fiber bundle 406.

Figure 9A:
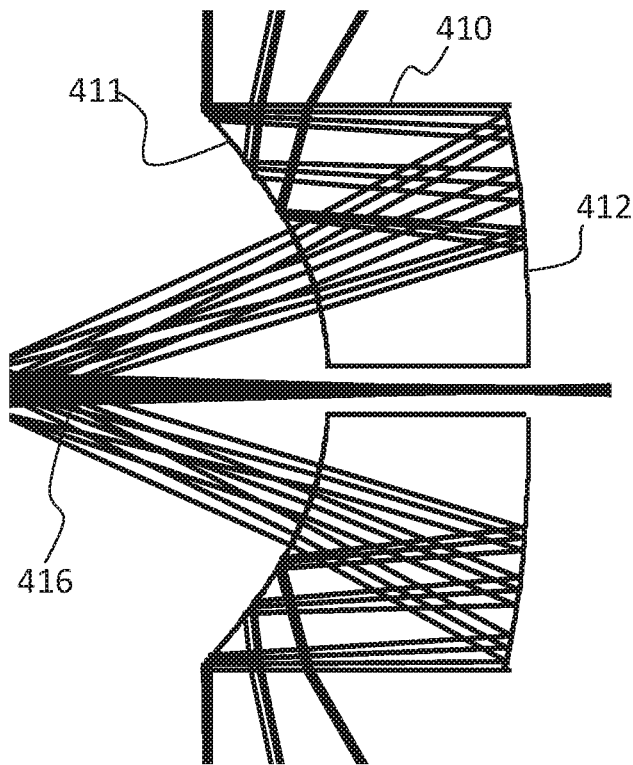
FIG. 9($a$) is an enlarged view of the optical device of the third example.
FIG. 9(b) is an enlarged view of a reflecting surface of the third example.

FIG. 9(a) is an enlarged view of the optical device 404 of Embodiment 3. As illustrated in FIG. 9(a), by having a hole in the optical device 404, the illumination optical flux 416 is prevented from reflecting and returning onto the fiber bundle end surface 415 (not shown) and resulting in flare. In particular, the illuminating light tends to be very strong with respect to the reflected light, and hence tends to generate flare. Therefore, the system of reducing the number of reflecting surfaces of Embodiment 3 may be effective. This configuration prevents such an event that the illumination optical flux 416 returns to the illumination fiber 407 (not shown), for example, when a laser light source is used as the light source (which is not illustrated) and hence the light source becomes unstable.

Figure 9B:
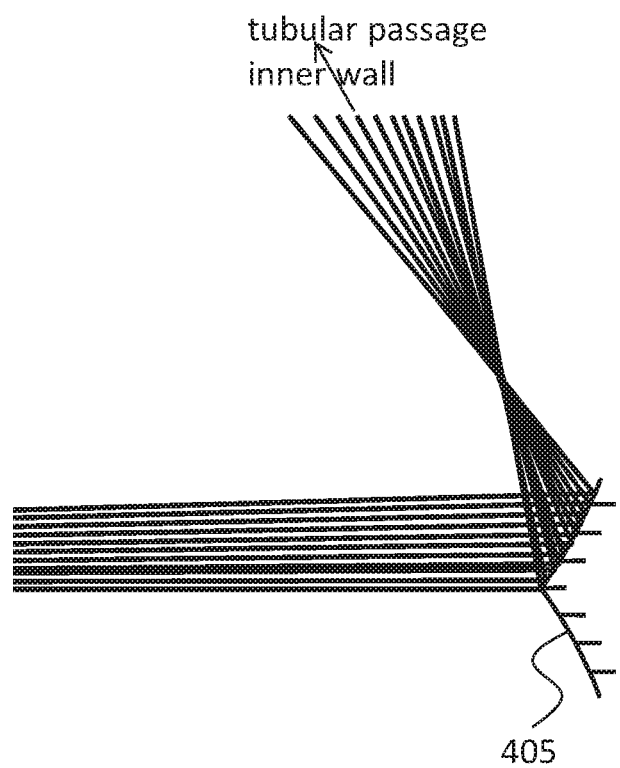

An enlarged view of the reflecting surface 405 of Embodiment three is illustrated in FIG. 9(b). As illustrated in FIG. 9(b), the reflecting surface 405 is a reflecting surface having a highest point and a positive optical power. In this configuration, the illumination optical flux 416 is allowed to reach a large circumference of the tubular passage inner wall 408.

Fourth Embodiment

Figure 10:
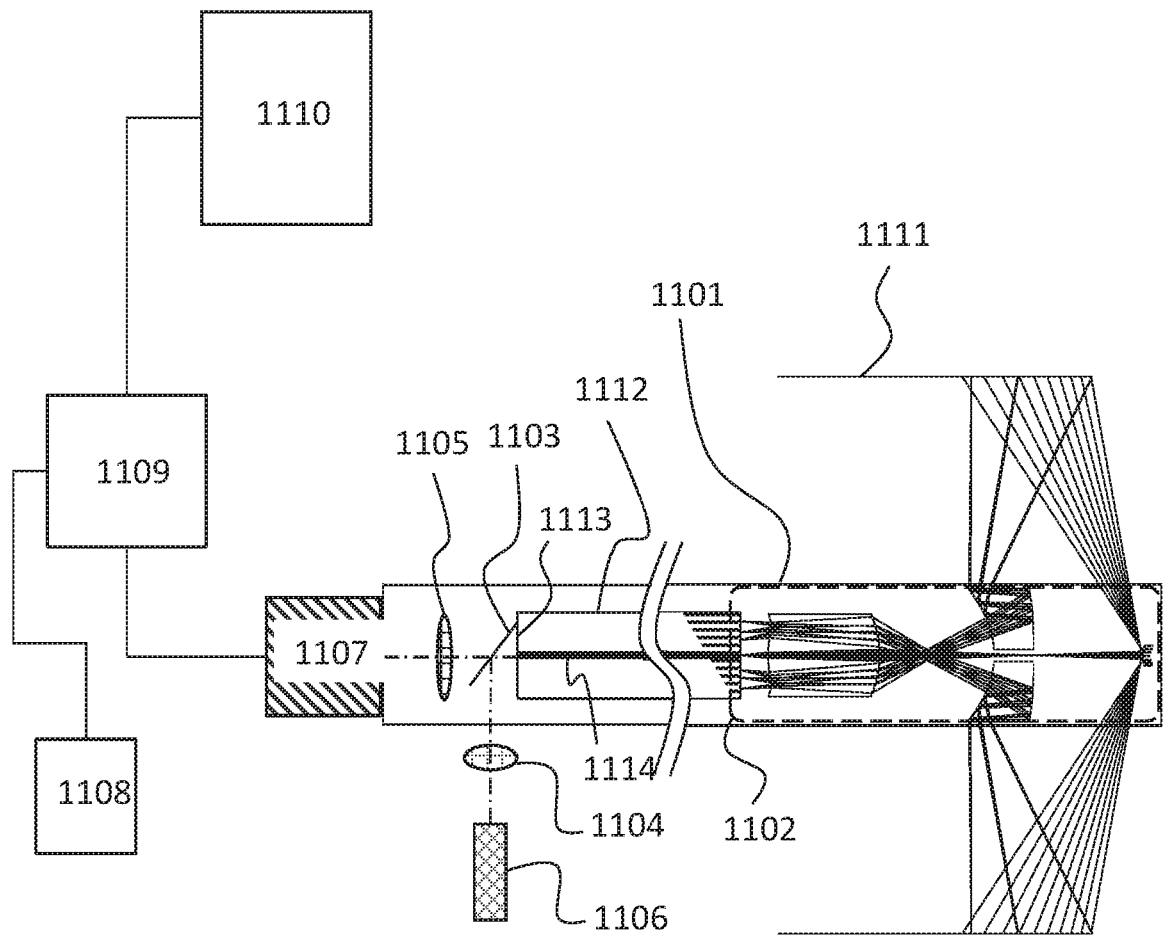
FIG. 10 is an explanatory drawing illustrating a fourth example of the invention.

Referring now to FIG. 10, Embodiment four of the invention will be described. Embodiment four is an exemplary endoscopic apparatus having the optical system described in Embodiment three.

An optical system 1101 having a configuration in which imaging and illumination are integrated as described in Embodiment three is arranged at a distal end of the endoscope, and an image of a tubular passage inner wall 1111 formed by the optical system 1101 is transmitted by a fiber bundle 1112, and is projected on an end surface 1113 on the opposite side from the optical system 1101. The image on the end surface 1113 is photographed by a camera 1107 via an imaging optical system 1105.

Reference numeral 1106 denotes a light source and, here, a case of the laser light source is supposed. Illuminating light emitted from the light source 1106 is converted into a convergent optical flux by a coupling lens 1104, and enters an illumination fiber 1114 via a beam splitter 1103. The beam splitter 1103 employed here may be a polarizing beam splitter or a half mirror.

An image photographed by the camera 1107 is stored in a memory 1108 via an image processing circuit 1109. The image is displayed from the image processing circuit 1109 on a monitor 1110, so that a user is allowed to observe the image. The image taken by the optical system 1101 is a ring-shaped image. Therefore, the image processing circuit 1109 may have a converting function that converts the ring-shaped image into a normal rectangular image.

Numerical Value Examples

Table 1 to 3 show examples of numerical values. In the table, the light source position is defined as a reference of an absolute coordinate system. Tables 1, 2, 3, and 4 correspond to Embodiment one, Tables 5, 6, 7, and 8 correspond to Embodiment two, and Tables 9, 10, 11, and 12 correspond to Embodiment three, respectively.

Three-dimensional coordinate axes of the absolute coordinate system are defined as Z-axis, Y-axis, and X-axis, and are defined as follows.

- Z-axis: a line passing from a center of a zeroth surface through a center of a first surface (original point of the absolute coordinate original point), and the direction of this axis is defined as a positive direction.
- Y-axis: a line passing through the center of the first surface (original point of the absolute coordinate original point), and form 90 degrees with respect to the Z-axis counterclockwise.
- X-axis: a line passing through the original point and being perpendicular to the Z-axis and the Y-axis.

In this example, a rotational symmetric aspherical surface is used, and the shape of the surface is expressed by the following equation.

$$Z = \frac{cr^2}{1 + \sqrt{(1+k)c^2 r^2}} + Ar^4 + Br^6 + Cr^8 + Dr^{10} \quad (3)$$

where k is a Korenich coefficient.

In the same manner, in this example, an odd-order aspherical shape is employed, and the shape of the surface is expressed by a following expression.

$$Z = \frac{cr^2}{1 + \sqrt{(1+k)c^2 r^2}} + AR1r + AR2r^2 + AR3r^3 + AR4r^4 \quad (4)$$

In this example, a cylindrical surface is employed. In Tables, the shapes of the surface is classified in the columns "Type", in which blank means the spherical shape, AL means the rotational symmetrical aspherical shape, ODD means the odd-order aspherical shape, and CYL means the cylindrical shape, and respective coefficients are shown in different tables. The stop surface is expressed by STO. When the respective surfaces are rotated or moved, the amounts of rotation and movement with the OBJ surface are defined in the Table.

The example of the numerical values are all values directed from the fiber bundle end surface as an imaging plane or the surface of the imaging element toward the tubular passage inner wall, which is an object point.

EXAMPLE 1

Table 1 shows a configuration of surfaces of the imaging optical system in Embodiment one, and Table 2 shows aspherical coefficients thereof. Table 3 shows a configuration of surfaces of the illuminating optical system in Embodiment one, and Table 4 shows aspherical coefficients thereof. The image-side NA of this optical system is 0.07, and the stop diameter is 0.028 mm.

TABLE 1

| No. | Type | Rx | Ry | D | Nd | vd |
|---|---|---|---|---|---|---|
| 115 |  | 0.000 | 0.000 | 0.200 |  |  |
| 114 | AL | 0.318 | 0.318 | 1.053 | 2.1030 | 18.1 |
| 113 | AL | −0.527 | −0.527 | 0.289 |  |  |
| 117 | STO | 0.000 | 0.000 | 0.318 |  |  |
| 111a | AL | −0.358 | −0.358 | 0.326 | 2.1030 | 18.1 |
| 112a | AL | −4.000 | −4.000 | −0.326 | −2.1030 | −18.1 |
| 111a | AL | −0.358 | −0.358 | 0.000 | 2.1030 | 18.1 |
| 110 | CYL | 0.000 | −0.360 | 0.000 |  |  |
| 108 | CYL | 0.000 | −1.500 |  |  |  |

TABLE 2

| No. | Coefficient | | | | |
|---|---|---|---|---|---|
| 114 | k | A | B | C | D |
|  | 0.000 | −18.669 | 52.468 | −1069.170 | 0.000 |
|  | X-Shift | Y-Shift | Z-Shift | | |
|  | 0.00 | 0.00 | 0.00 | | |
|  | X-Rotation | Y-Rotation | Z-Rotation | | |
|  | 0.00 | 0.00 | 0.00 | | |
| 113 | k | A | B | C | D |
|  | 0.000 | 1.450 | −3.243 | 0.000 | 0.000 |
|  | X-Shift | Y-Shift | Z-Shift | | |
|  | 0.00 | 0.00 | 0.00 | | |
|  | X-Rotation | Y-Rotation | Z-Rotation | | |
|  | 0.00 | 0.00 | 0.00 | | |
| 112a | k | A | B | C | D |
|  | 0.000 | −7.866 | 91.369 | 0.000 | 0.000 |
|  | X-Shift | Y-Shift | Z-Shift | | |
|  | 0.00 | 0.00 | 0.00 | | |
|  | X-Rotation | Y-Rotation | Z-Rotation | | |
|  | 0.00 | 0.00 | 0.00 | | |

TABLE 2-continued

| No. | Coefficient | | | | |
|---|---|---|---|---|---|
| 111a | k | A | B | C | D |
|  | 0.000 | −4.088 | 31.148 | −95.309 | 0.000 |
|  | X-Shift | Y-Shift | Z-Shift | | |
|  | 0.00 | 0.00 | 0.00 | | |
|  | X-Rotation | Y-Rotation | Z-Rotation | | |
|  | 0.00 | 0.00 | 0.00 | | |
| 110 | k | A | B | C | D |
|  | 0.000 | 0.000 | 0.000 | 0.000 | 0.000 |
|  | X-Shift | Y-Shift | Z-Shift | | |
|  | 0.00 | 0.00 | 0.00 | | |
|  | X-Rotation | Y-Rotation | Z-Rotation | | |
|  | 90.00 | 0.00 | 0.00 | | |
| 108 | k | A | B | C | D |
|  | 0.000 | 0.000 | 0.000 | 0.000 | 0.000 |
|  | X-Shift | Y-Shift | Z-Shift | | |
|  | 0.00 | 1.50 | 1.40 | | |
|  | X-Rotation | Y-Rotation | Z-Rotation | | |
|  | 90.00 | 0.00 | 0.00 | | |

TABLE 3

| No. | Type | Rx | Ry | D | Nd | vd |
|---|---|---|---|---|---|---|
| 115 |  | 0.000 | 0.000 | 0.200 | | |
| 114 | AL | 0.318 | 0.318 | 1.053 | 2.1030 | 18.1 |
| 113 | AL | −0.527 | −0.527 | 0.289 | | |
| 117 | STO | 0.000 | 0.000 | 0.318 | | |
| 111b | AL | −0.358 | −0.358 | 0.326 | 2.1030 | 18.1 |
| 112b | AL | −4.000 | −4.000 | 1.000 | | |
| 105 | ODD | 0.000 | 0.000 | 0.000 | | |
| 108 | CYL | 0.000 | −1.500 | | | |

TABLE 4

| 114 | k | A | B | C | D |
|---|---|---|---|---|---|
|  | 0.000 | −18.669 | 52.468 | −1069.170 | 0.000 |
|  | X-Shift | Y-Shift | Z-Shift | | |
|  | 0.00 | 0.00 | 0.00 | | |
|  | X-Rotation | Y-Rotation | Z-Rotation | | |
|  | 0.00 | 0.00 | 0.00 | | |
| 113 | k | A | B | C | D |
|  | 0.000 | 1.450 | −3.243 | 0.000 | 0.000 |
|  | X-Shift | Y-Shift | Z-Shift | | |
|  | 0.00 | 0.00 | 0.00 | | |
|  | X-Rotation | Y-Rotation | Z-Rotation | | |
|  | 0.00 | 0.00 | 0.00 | | |
| 112b | k | A | B | C | D |
|  | 0.000 | −7.866 | 91.369 | 0.000 | 0.000 |
|  | X-Shift | Y-Shift | Z-Shift | | |
|  | 0.00 | 0.00 | 0.00 | | |
|  | X-Rotation | Y-Rotation | Z-Rotation | | |
|  | 0.00 | 0.00 | 0.00 | | |
| 111b | k | A | B | C | D |
|  | 0.000 | −4.088 | 31.148 | −95.309 | 0.000 |
|  | X-Shift | Y-Shift | Z-Shift | | |
|  | 0.00 | 0.00 | 0.00 | | |
|  | X-Rotation | Y-Rotation | Z-Rotation | | |
|  | 0.00 | 0.00 | 0.00 | | |
| 105 | k | AR1 | AR2 | AR3 | AR4 |
|  | 0.000 | 0.420 | 20.000 | 0.000 | 0.000 |
|  | X-Shift | Y-Shift | Z-Shift | | |
|  | 0.00 | 0.00 | 0.00 | | |
|  | X-Rotation | Y-Rotation | Z-Rotation | | |
|  | 0.00 | 0.00 | 0.00 | | |
| 108 | k | A | B | C | D |
|  | 0.000 | 0.000 | 0.000 | 0.000 | 0.000 |
|  | X-Shift | Y-Shift | Z-Shift | | |
|  | 0.00 | 1.50 | 1.40 | | |
|  | X-Rotation | Y-Rotation | Z-Rotation | | |
|  | 90.00 | 0.00 | 0.00 | | |

Lens Thickness L1=1.053
Entire Length L2=2.186
L1/L2=0.482
Maximum Image Height: 0.18 mm

EXAMPLE 2

Table 5 shows a configuration of surfaces of the imaging optical system in Embodiment two, and Table 6 shows aspherical coefficients thereof. Table 7 shows a configuration of surfaces of the illuminating optical system in Embodiment one, and Table 8 shows aspherical coefficients thereof. The image-side NA of this optical system is 0.07, and the stop diameter is 0.028 mm.

TABLE 5

| No. | Type | Rx | Ry | D | Nd | vd |
|---|---|---|---|---|---|---|
| 506 |  | 0.000 | 0.000 | 0.201 | | |
| 514 | AL | 0.332 | 0.332 | 0.778 | 1.7300 | 32.0 |
| 513 | AL | −0.351 | −0.351 | 0.308 | | |
| 517 | STO | 0.000 | 0.000 | 0.578 | | |
| 511a | AL | −0.375 | −0.375 | 0.261 | 1.7300 | 32.0 |
| 512a | AL | −4.581 | −4.581 | −0.261 | −1.7300 | −32.0 |
| 511a | AL | −0.375 | −0.375 | 0.000 | 1.7300 | 32.0 |
| 510 | CYL | 0.000 | −0.360 | 0.000 | | |
| 508 | CYL | 0.000 | −1.500 | | | |

TABLE 6

| No. | Coefficient | | | | |
|---|---|---|---|---|---|
| 514 | k | A | B | C | D |
|  | 0.000 | −24.403 | −316.460 | −4297.240 | 0.000 |
|  | X-Shift | Y-Shift | Z-Shift | | |
|  | 0.00 | 0.00 | 0.00 | | |
|  | X-Rotation | Y-Rotation | Z-Rotation | | |
|  | 0.00 | 0.00 | 0.00 | | |
| 513 | k | A | B | C | D |
|  | 0.000 | 2.250 | 15.330 | 0.000 | 0.000 |
|  | X-Shift | Y-Shift | Z-Shift | | |
|  | 0.00 | 0.00 | 0.00 | | |
|  | X-Rotation | Y-Rotation | Z-Rotation | | |
|  | 0.00 | 0.00 | 0.00 | | |
| 512a | k | A | B | C | D |
|  | 0.000 | −5.012 | 64.687 | 0.000 | 0.000 |
|  | X-Shift | Y-Shift | Z-Shift | | |
|  | 0.00 | 0.00 | 0.00 | | |
|  | X-Rotation | Y-Rotation | Z-Rotation | | |
|  | 0.00 | 0.00 | 0.00 | | |
| 511a | k | A | B | C | D |
|  | 0.000 | −3.852 | 26.274 | −69.529 | 0.000 |
|  | X-Shift | Y-Shift | Z-Shift | | |
|  | 0.00 | 0.00 | 0.00 | | |
|  | X-Rotation | Y-Rotation | Z-Rotation | | |
|  | 0.00 | 0.00 | 0.00 | | |
| 510 | k | A | B | C | D |
|  | 0.000 | 0.000 | 0.000 | 0.000 | 0.000 |
|  | X-Shift | Y-Shift | Z-Shift | | |
|  | 0.00 | 0.00 | 0.00 | | |
|  | X-Rotation | Y-Rotation | Z-Rotation | | |
|  | 90.00 | 0.00 | 0.00 | | |
| 508 | k | A | B | C | D |
|  | 0.000 | 0.000 | 0.000 | 0.000 | 0.000 |
|  | X-Shift | Y-Shift | Z-Shift | | |
|  | 0.00 | 1.50 | 1.40 | | |
|  | X-Rotation | Y-Rotation | Z-Rotation | | |
|  | 90.00 | 0.00 | 0.00 | | |

TABLE 7

| No. | Type | Rx | Ry | D | Nd | vd |
|---|---|---|---|---|---|---|
| 506 |  | 0.000 | 0.000 | 0.201 | | |
| 514 | AL | 0.332 | 0.332 | 0.778 | 1.7300 | 32.0 |

TABLE 7-continued

| No. | Type | Rx | Ry | D | Nd | vd |
|-----|------|-----|-----|-----|------|------|
| 513 | AL | −0.351 | −0.351 | 0.308 | | |
| 517 | STO | 0.000 | 0.000 | 0.578 | | |
| 511b | | 0.200 | 0.200 | 0.279 | 1.7300 | 32.0 |
| 512b | AL | −4.581 | −4.581 | −0.261 | −1.7300 | −32.0 |
| 505 | ODD | 0.000 | 0.000 | 0.000 | | |
| 508 | CYL | 0.000 | −1.500 | | | |

TABLE 8

| No. | | Coefficient | | | |
|-----|---|---|---|---|---|
| 514 | k | A | B | C | D |
| | 0.000 | −24.403 | −316.460 | −4297.240 | 0.000 |
| | X-Shift | Y-Shift | Z-Shift | | |
| | 0.00 | 0.00 | 0.00 | | |
| | X-Rotation | Y-Rotation | Z-Rotation | | |
| | 0.00 | 0.00 | 0.00 | | |
| 513 | k | A | B | C | D |
| | 0.000 | 2.250 | 15.330 | 0.000 | 0.000 |
| | X-Shift | Y-Shift | Z-Shift | | |
| | 0.00 | 0.00 | 0.00 | | |
| | X-Rotation | Y-Rotation | Z-Rotation | | |
| | 0.00 | 0.00 | 0.00 | | |
| 512b | k | A | B | C | D |
| | 0.000 | −5.012 | 64.687 | 0.000 | 0.000 |
| | X-Shift | Y-Shift | Z-Shift | | |
| | 0.00 | 0.00 | 0.00 | | |
| | X-Rotation | Y-Rotation | Z-Rotation | | |
| | 0.00 | 0.00 | 0.00 | | |
| 511b | k | A | B | C | D |
| | 0.000 | 0.000 | 0.000 | 0.000 | 0.000 |
| | X-Shift | Y-Shift | Z-Shift | | |
| | 0.00 | 0.00 | 0.00 | | |
| | X-Rotation | Y-Rotation | Z-Rotation | | |
| | 0.00 | 0.00 | 0.00 | | |
| 505 | k | AR1 | AR2 | AR3 | AR4 |
| | 0.000 | 0.440 | 1.500 | 0.000 | 0.000 |
| | X-Shift | Y-Shift | Z-Shift | | |
| | 0.00 | 0.00 | 0.00 | | |
| | X-Rotation | Y-Rotation | Z-Rotation | | |
| | 0.00 | 0.00 | 0.00 | | |
| 508 | k | A | B | C | D |
| | 0.000 | 0.000 | 0.000 | 0.000 | 0.000 |
| | X-Shift | Y-Shift | Z-Shift | | |
| | 0.00 | 1.50 | 1.40 | | |
| | X-Rotation | Y-Rotation | Z-Rotation | | |
| | 90.00 | 0.00 | 0.00 | | |

Lens Thickness L1=0.778

Entire Length L2=1.884

L1/L2=0.413

Maximum Image Height: 0.18 mm

EXAMPLE 3

Table 9 shows a configuration of surfaces of the imaging optical system in Embodiment two, and Table 10 shows aspherical coefficients thereof. Table 11 shows a configuration of surfaces of the illuminating optical system in Embodiment one, and Table 12 shows aspherical coefficients thereof. The image-side NA of this optical system is 0.07, and the stop diameter is 0.028 mm.

TABLE 9

| No. | Type | Rx | Ry | D | Nd | vd |
|-----|------|-----|-----|-----|------|------|
| 815 | | 0.000 | 0.000 | 0.200 | | |
| 814 | AL | 0.344 | 0.344 | 0.802 | 1.8467 | 23.8 |
| 813 | AL | −0.400 | −0.400 | 0.336 | | |
| 818 | STO | 0.000 | 0.000 | 0.486 | | |
| 811 | AL | −0.412 | −0.412 | 0.285 | 1.8467 | 23.8 |
| 812 | AL | −13.137 | −13.137 | −0.285 | −1.8467 | −23.8 |
| 811 | AL | −0.412 | −0.412 | 0.000 | 1.8467 | 23.8 |
| 810 | CYL | 0.000 | −0.360 | 0.000 | | |
| 808 | CYL | 0.000 | −1.500 | | | |

TABLE 10

| No. | | Coefficient | | | |
|-----|---|---|---|---|---|
| 814 | k | A | B | C | D |
| | 0.000 | −20.549 | −183.053 | −2467.530 | 0.000 |
| | X-Shift | Y-Shift | Z-Shift | | |
| | 0.00 | 0.00 | 0.00 | | |
| | X-Rotation | Y-Rotation | Z-Rotation | | |
| | 0.00 | 0.00 | 0.00 | | |
| 813 | k | A | B | C | D |
| | 0.000 | 1.306 | 9.443 | 0.000 | 0.000 |
| | X-Shift | Y-Shift | Z-Shift | | |
| | 0.00 | 0.00 | 0.00 | | |
| | X-Rotation | Y-Rotation | Z-Rotation | | |
| | 0.00 | 0.00 | 0.00 | | |
| 811 | k | A | B | C | D |
| | 0.000 | −3.762 | 40.851 | 0.000 | 0.000 |
| | X-Shift | Y-Shift | Z-Shift | | |
| | 0.00 | 0.00 | 0.00 | | |
| | X-Rotation | Y-Rotation | Z-Rotation | | |
| | 0.00 | 0.00 | 0.00 | | |
| 812 | k | A | B | C | D |
| | 0.000 | −3.779 | 24.388 | −62.054 | 0.000 |
| | X-Shift | Y-Shift | Z-Shift | | |
| | 0.00 | 0.00 | 0.00 | | |
| | X-Rotation | Y-Rotation | Z-Rotation | | |
| | 0.00 | 0.00 | 0.00 | | |
| 810 | k | A | B | C | D |
| | 0.000 | 0.000 | 0.000 | 0.000 | 0.000 |
| | X-Shift | Y-Shift | Z-Shift | | |
| | 0.00 | 0.00 | 0.00 | | |
| | X-Rotation | Y-Rotation | Z-Rotation | | |
| | 90.00 | 0.00 | 0.00 | | |
| 808 | k | A | B | C | D |
| | 0.000 | 0.000 | 0.000 | 0.000 | 0.000 |
| | X-Shift | Y-Shift | Z-Shift | | |
| | 0.00 | 1.50 | 1.40 | | |
| | X-Rotation | Y-Rotation | Z-Rotation | | |
| | 90.00 | 0.00 | 0.00 | | |

TABLE 11

| No. | Type | Rx | Ry | D | Nd | vd |
|-----|------|-----|-----|-----|------|------|
| 815 | | 0.000 | 0.000 | 0.201 | | |
| 814 | AL | 0.332 | 0.332 | 0.778 | 1.7300 | 32.0 |
| 813 | AL | −0.351 | −0.351 | 0.308 | | |
| 818 | STO | 0.000 | 0.000 | 1.571 | | |
| 805 | ODD | 0.000 | 0.000 | 0.000 | | |
| 808 | CYL | 0.000 | −1.500 | | | |

TABLE 12

| No. | | Coefficient | | | |
|-----|---|---|---|---|---|
| 814 | k | A | B | C | D |
| | 0.000 | −24.403 | −316.460 | −4297.240 | 0.000 |
| | X-Shift | Y-Shift | Z-Shift | | |
| | 0.00 | 0.00 | 0.00 | | |
| | X-Rotation | Y-Rotation | Z-Rotation | | |
| | 0.00 | 0.00 | 0.00 | | |

TABLE 12-continued

| No. | Coefficient | | | | |
|---|---|---|---|---|---|
| 813 | k | A | B | C | D |
| | 0.000 | 2.250 | 15.330 | 0.000 | 0.000 |
| | X-Shift | Y-Shift | Z-Shift | | |
| | 0.00 | 0.00 | 0.00 | | |
| | X-Rotation | Y-Rotation | Z-Rotation | | |
| | 0.00 | 0.00 | 0.00 | | |
| 805 | k | AR1 | AR2 | AR3 | AR4 |
| | 0.000 | 0.820 | −9.500 | 0.000 | 0.000 |
| | X-Shift | Y-Shift | Z-Shift | | |
| | 0.00 | 0.00 | 0.00 | | |
| | X-Rotation | Y-Rotation | Z-Rotation | | |
| | 0.00 | 0.00 | 0.00 | | |
| 808 | k | A | B | C | D |
| | 0.000 | 0.000 | 0.000 | 0.000 | 0.000 |
| | X-Shift | Y-Shift | Z-Shift | | |
| | 0.00 | 1.50 | 1.40 | | |
| | X-Rotation | Y-Rotation | Z-Rotation | | |
| | 90.00 | 0.00 | 0.00 | | |

Figure 11:
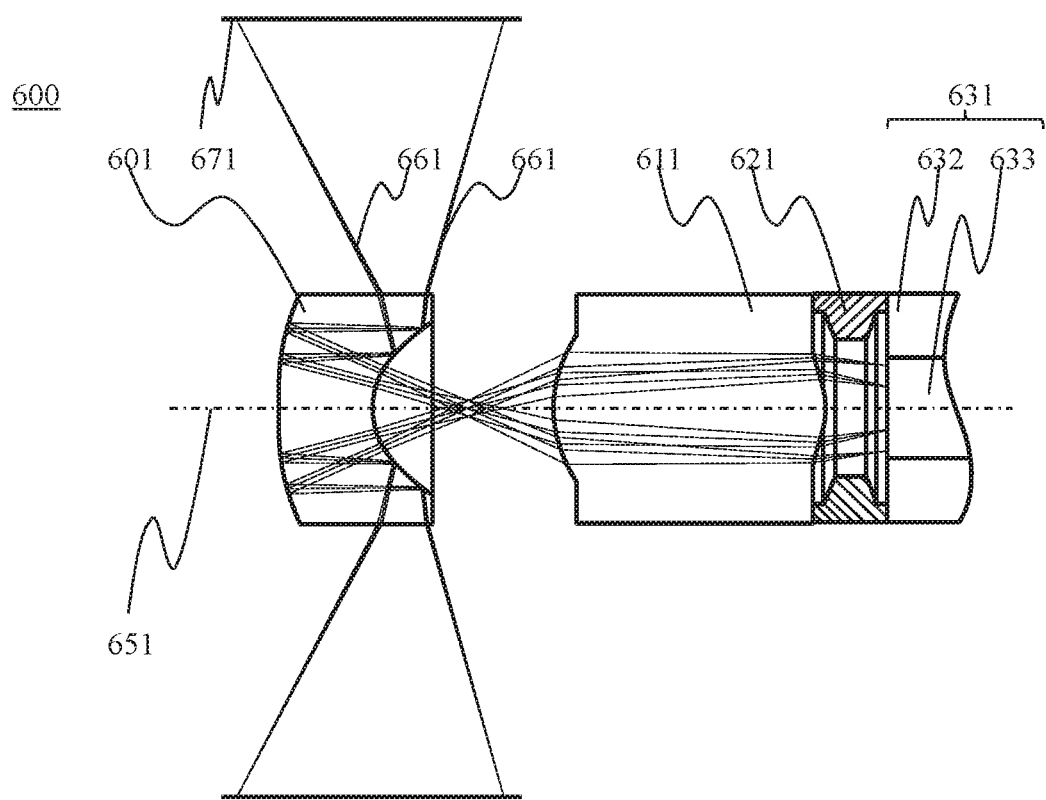
FIG. 11 is a sectional view for illustrating a structure of an optical system according to the present invention.

Lens Thickness L1=0.802
Entire Length L2=1.884
L1/L2=0.440
Maximum Image Height: 0.18 mm
Fifth Embodiment The fifth embodiment provides an optical system according to the present invention. FIG. 11 is a sectional view of a structure of this exemplary optical system 600.

First, the structure of the optical system 600 is described with reference to FIG. 11. The optical system 600 includes a first lens 601, a second lens 611, a spacer 621, and an image pickup fiber 631, which are coaxially disposed. The image pickup fiber 631 includes a fiber holding unit 632 and a fiber unit 633.

The first lens 601 and the second lens 611 optically function to allow an annular object surface 671 and an end face of the fiber unit 633 of the image pickup fiber 631 to be positioned at a conjugate position. That is, an image of an annular object that is positioned close to the annular object surface 671 is focused on the end face of the fiber unit 633 of the image pickup fiber 631.

Figure 12A:
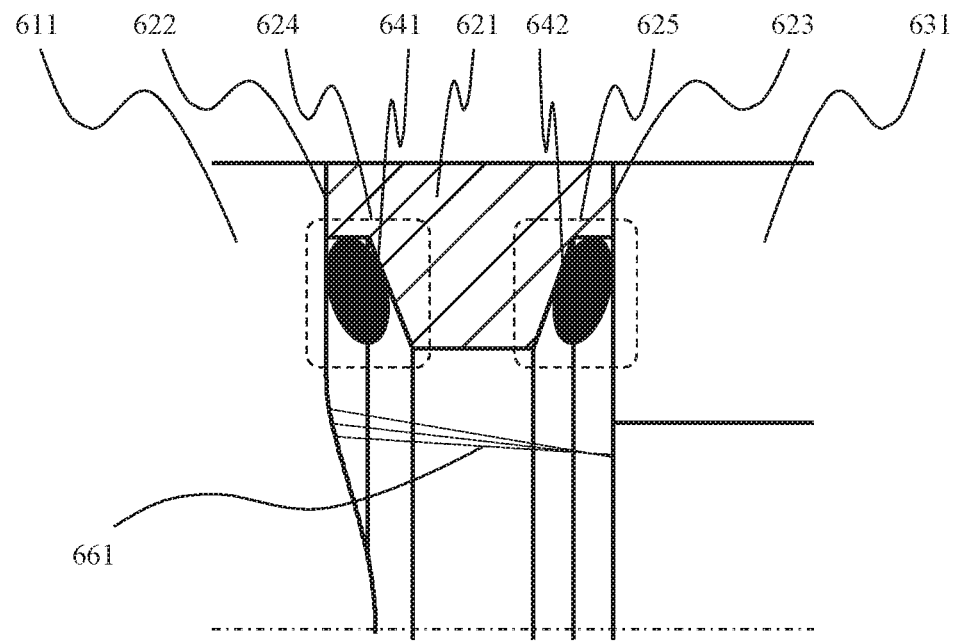
FIGS. 12A and 12B are each a partial sectional view for illustrating structures of contact portions and bonding portions of the optical system according to the present invention.

The second lens 611 and the image pickup fiber 631 are both in contact with the spacer 621. The second lens 611 and the image pickup fiber 631 are bonded and secured to each other at portions of the second lens 611 and the image pickup fiber 631 differing from the portions where they contact the spacer 621. FIG. 12A is an enlarged view of contact portions 622 and 623 and bonding portions of the spacer 621.

The spacer 621 includes the contact portions 622 and 623 and adhesive reservoirs 624 and 625. Thus, in this embodiment, an adhesive reservoir 624 and 625 is located adjacent to the air or vacuum space through which a light beam passes. However, the adhesive is preferably not overlapping with a light beam that is directed through the optical system. The second lens 611 is in contact with the contact portion 622, and is secured to the spacer 621 by an adhesive 641 applied to the adhesive reservoir 624. Similarly, the fiber holding unit 632 of the image pickup fiber 631 is in contact with the contact portion 623, and is secured to the spacer 621 by an adhesive 642 applied to the adhesive reservoir 625.

The second lens 611 and the spacer 621 are brought into contact with each other and bonded to each other by the following procedures.

First, the adhesive 641 is applied to the adhesive reservoir 622. At this time, considering the dripping of the adhesive due to gravity, the orientation of the spacer may be adjusted as appropriate.

Next, the second lens 611 is brought into contact with the contact portion 622 of the spacer 621. At this time, in order to position the second lens 611 and the spacer 621 in a decentering direction, a method for restricting displacements thereof in the decentering direction with a jig may be used.

Finally, the adhesive 641 is cured. For example, if the adhesive 641 is an ultraviolet (UV) curing adhesive, the adhesive 641 is irradiated with ultraviolet light, and if the adhesive 641 is a thermosetting adhesive, the adhesive 641 is heated.

The procedures for bringing the image pickup fiber 631 and the spacer 621 into contact with each other and bonding the image pickup fiber 631 and the spacer 621 to each other are the same as those described above.

Next, advantages of the optical system 600 are described. FIG. 12A shows a state in which a proper amount of adhesive 641 and a proper amount of adhesive 642 are applied, whereas FIG. 12B shows a state in which an excessive amount of adhesive 643 and an excessive amount of adhesive 644 are accidentally applied.

Since the excessively applied adhesive 643 is compressed in the process of bringing the second lens 611 and the spacer 621 into contact with each other, the adhesive 643 tries to spread into the vicinity from where the adhesive 643 has been applied.

In the present invention, since the adhesive reservoir 624 opens into a space through which an light beam 661 passes, the adhesive 643 tends to spread in the direction of the light beam 661. Since the contact portion 622 between the second lens 611 and the spacer 621 is disposed outside of the adhesive reservoir 624, the adhesive 643 is less likely to spread beyond and outwardly from the contact portion 622. Here, the term "outwardly" refers to a direction away from an optical axis 651.

In the description below, the terms "outwardly", "outward", and "outer side" refer to a direction away from the optical axis 651, and the terms "inwardly" and "inward" refer to a direction approaching the optical axis 651.

As mentioned above, in the present invention, since the excessively applied adhesive 643 actively spreads in the direction of the light beam 661, the adhesive 643 spreads outwardly from the adhesive reservoir 624, as a result of which it is possible to prevent the adhesive 643 from protruding outwardly from the second lens 611 and the spacer 621.

Similarly, the excessively applied adhesive 644 also actively spreads in the direction of the light beam 661, so that it is possible to prevent the adhesive 644 from spreading outwardly from the adhesive reservoir 625 and protruding outwardly from the image pickup fiber 631 and the spacer 621.

Figure 12:
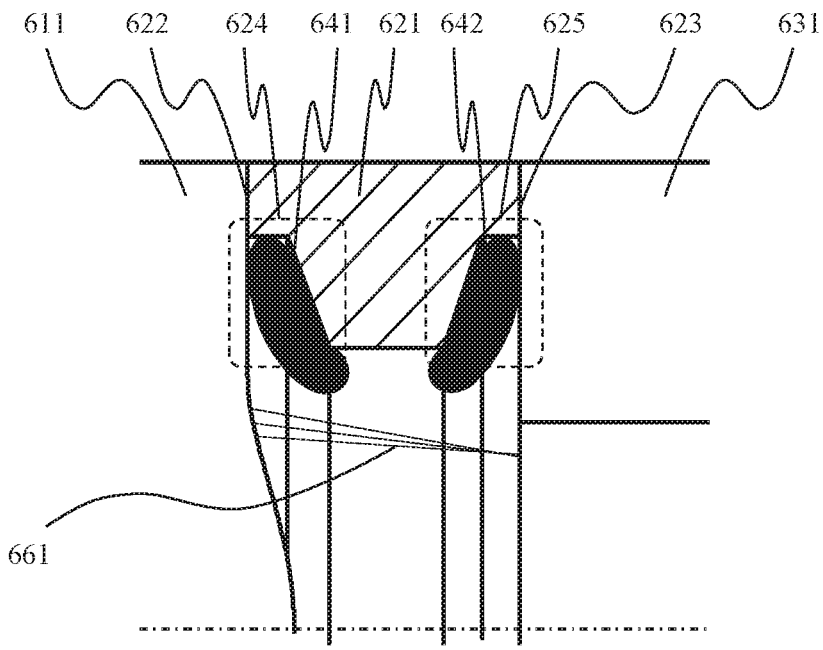
Figure 13:
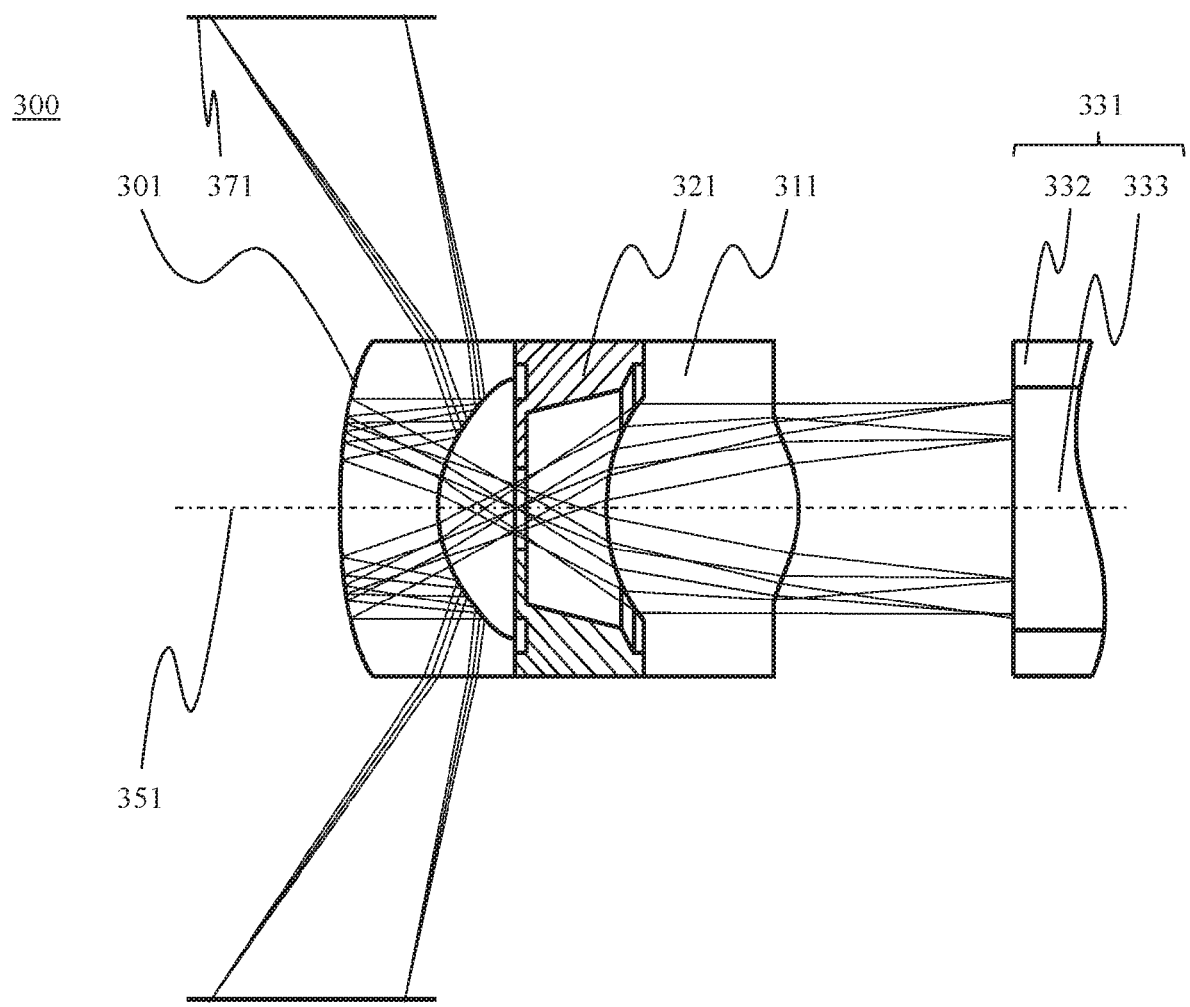
FIG. 13 is a sectional view for illustrating a structure of an optical system according to the present invention.

As shown in FIGS. 11 to 12B, the outside diameter of the light beam 661 of the optical system 600 is smallest at the end face of the image pickup fiber 631. In the optical system 600, the adhesive reservoir 625 is formed near the end face of the image pickup fiber 631. Therefore, it is possible to reduce the possibility with which the adhesive 644 that has spread inwardly from the adhesive reservoir 625 obstructs the light beam 661.

Due to the aforementioned advantages, in the optical system 600 according to the present invention, the possibility with which the outside diameter of the optical system 600 increases due to the adhesive protruding outwardly from the second lens 611 and the spacer 621 and the adhesive protruding outwardly from the spacer 621 and the image pickup sensor 631 is low. Therefore, the possibility with which undesired bonding occurs as a result of the outwardly protruded adhesives coming into contact with members disposed outside of the optical system 600 is low. By the above, the optical system 600 according to the present invention makes it possible to increase the precision of the amounts of applications of the adhesives and allowable ranges of variations in the amounts of applications of the adhesives, and to reduce required processing and assembly costs.

In the embodiment, the case in which a normal line to a surface of the contact portion 622 and a normal line to a surface of the contact portion 623 are parallel to the optical axis 651 is described. However, in order to provide the advantages of the present invention, the normal line to the surface of the contact portion 622 and the normal line to the surface of the contact portion 623 only need to include a component that is in a direction parallel to the optical axis 651. For example, the contact portions 622 and 623 may each be a tapering surface in which the optical axis 651 is a central axis.

Each adhesive reservoir only needs to be formed at a surface where its corresponding contact portion is formed. For example, when each contact portion is a tapering surface such as that described above, each adhesive reservoir only needs to be formed at its corresponding tapering surface.

Sixth Embodiment

In a sixth embodiment, the position where an adhesive reservoir is formed is situated near a pupil where the outside diameter of an effective light beam is smallest, so that it is possible to reduce the possibility with which inwardly spread adhesives obstruct the light beam. Here, the term "inwardly" refers to a direction approaching an optical axis.

In the description below, the terms "outwardly", "outward", and "outer side" refer to a direction away from the optical axis, and the terms "inwardly" and "inward" refer to a direction approaching the optical axis.

FIG. 63 is a sectional view of an optical system 300 according to the present invention. First, with reference to FIG. 63, a structure of the optical system 300 is described. The optical system 300 includes a first lens 301, a second lens 311, a spacer 321, and an image pickup sensor 331, which are coaxially disposed. The image pickup sensor 331 includes a sensor holding unit 332 and a sensor unit 333.

The first lens 301 and the second lens 311 optically function to allow an annular object surface 371 and an end face of the sensor unit 333 of the image pickup sensor 331 to be positioned at a conjugate position. That is, an image of an annular object that is positioned close to the annular object surface 371 is focused on the end face of the sensor unit 333 of the image pickup sensor 331.

Figure 14:
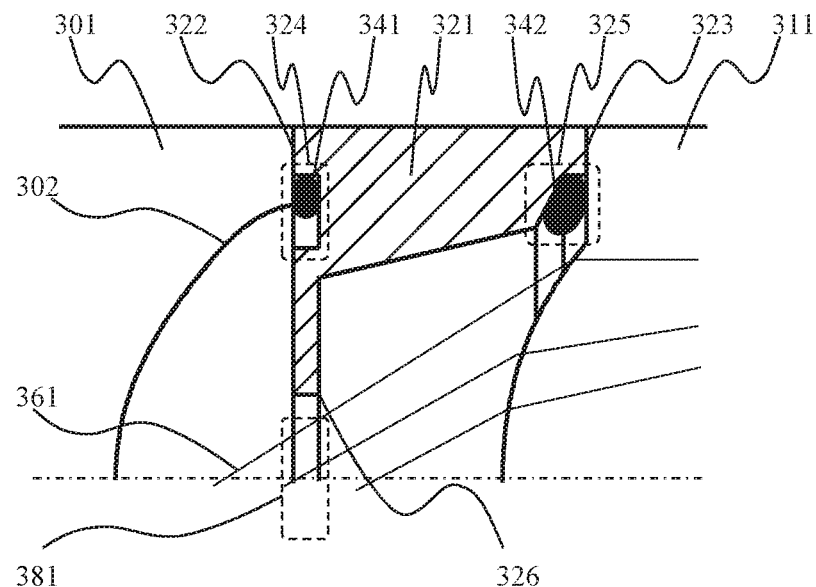
FIGS. 14A and 14B are each a partial sectional view for illustrating structures of contact portions and bonding portions of the optical system according to the present invention.
Figure 14:
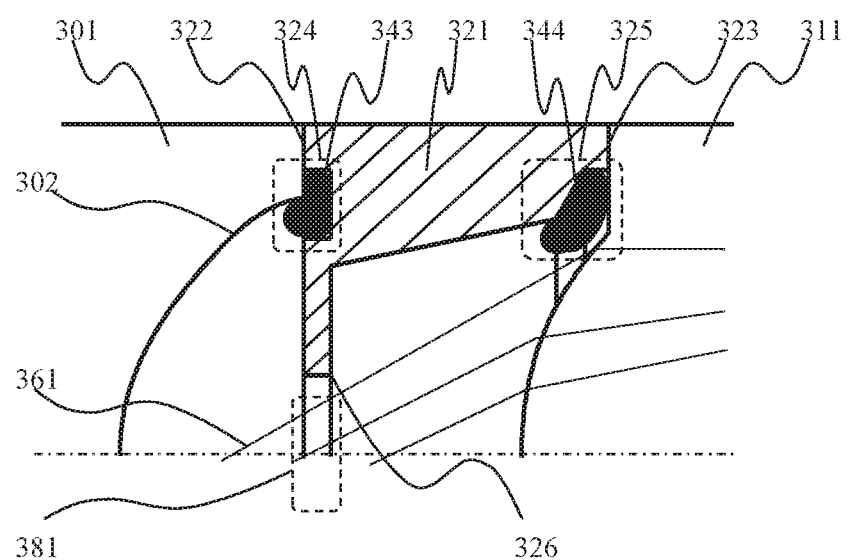

The first lens 301 and the second lens 311 are both in contact with the spacer 321. The first lens 301 and the second lens 311 are bonded and secured to each other at portions of the first lens 301 and the second lens 311 differing from the portions where they contact the spacer 321. FIG. 14A is an enlarged view of contact portions 322 and 323 and bonding portions at the spacer 121.

The spacer 321 includes the contact portions 322 and 323 and adhesive reservoirs 324 and 325. The first lens 301 is in contact with the contact portion 322, and is secured to the spacer 321 by an adhesive 341 applied to the adhesive reservoir 324. Similarly, the second lens 311 is in contact with the contact portion 323, and is secured to the spacer 321 by an adhesive 342 applied to the adhesive reservoir 325.

The procedures for bringing the first lens 301 and the spacer 321 into contact with each other and bonding the first lens 301 and the spacer 321 to each other, and the procedures for bringing the second lens 311 and the spacer 321 into contact with each other and bonding the second lens 311 and the spacer 321 to each other may be the same as those described in the first embodiment.

An aperture stop 326 is formed in a surface that is the same as that where the adhesive reservoir 324 is formed. An exit pupil 381 for a light beam 361 of the optical system 300 is formed at a position that substantially corresponds with the position of an opening portion of the aperture stop 326. In this way, by integrating the aperture stop 326 with the spacer 321, compared to a case in which they are separately formed, it is possible to reduce the number of component parts, the number of causes of assembly error, etc.

As seen in FIG. 14A and other figures as shown herein, the adhesive 342 may be applied to either concave lens surfaces, as with the first lens 301 or a convex lens surface, as with the second lens 311. While only two lens are shown in this embodiment, other embodiments are contemplated having three or more lenses with convex or concave surfaces as the bonding portion of the surface.

Next, advantages of the optical system 300 are described. FIG. 14A shows a state in which a proper amount of adhesive 341 and a proper amount of adhesive 342 are applied, whereas FIG. 14B shows a state in which an excessive amount of adhesive 343 and an excessive amount of adhesive 344 are accidentally applied.

Since the excessively applied adhesive 343 is compressed in the process of bringing the first lens 301 and the spacer 321 into contact with each other, the adhesive 343 tries to spread into the vicinity from where the adhesive 143 has been applied.

In the present invention, since the adhesive reservoir 324 opens into a space through which the light beam 361 passes, the adhesive 343 tends to spread in the direction of the light beam 361. Since the contact portion 322 between the first lens 301 and the spacer 321 is disposed outside of the adhesive reservoir 324, the adhesive 343 is less likely to spread beyond and outwardly from the contact portion 322.

Figure 15:
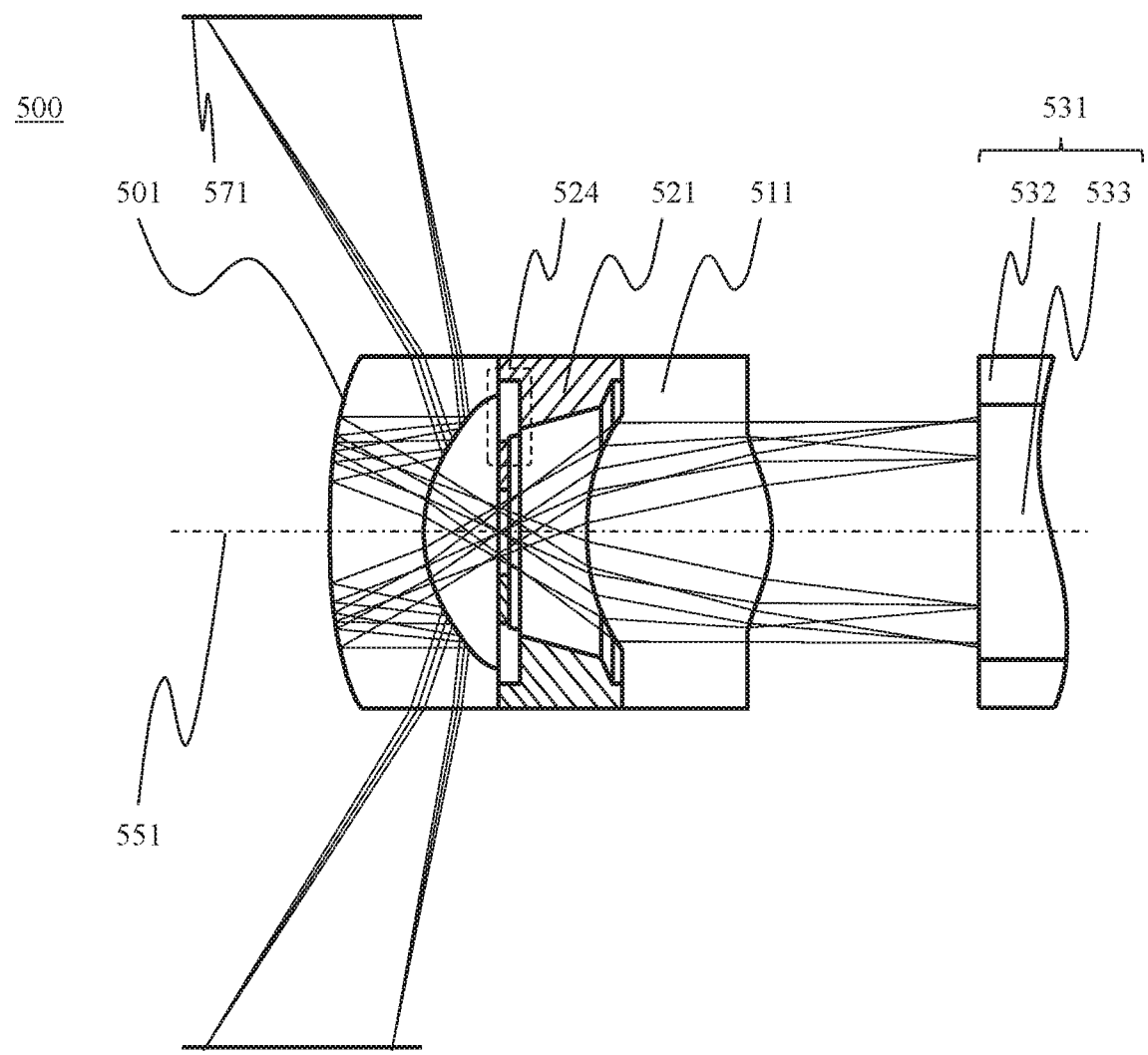
FIG. 15 is a sectional view for illustrating a structure of an optical system according to the present invention.

FIG. 15 is a sectional view of an optical system 500 that is a modification of the optical system 300 according to the present invention. The optical system 500 has the same structural features as the optical system 300 except that the structural feature of an adhesive reservoir 524 at a spacer 521 differs. Therefore, the optical system 500 is described while focusing on the structure of the adhesive reservoir 524 at the spacer 521 of the optical system 500 and advantages provided by the optical system 500.

Figure 16:
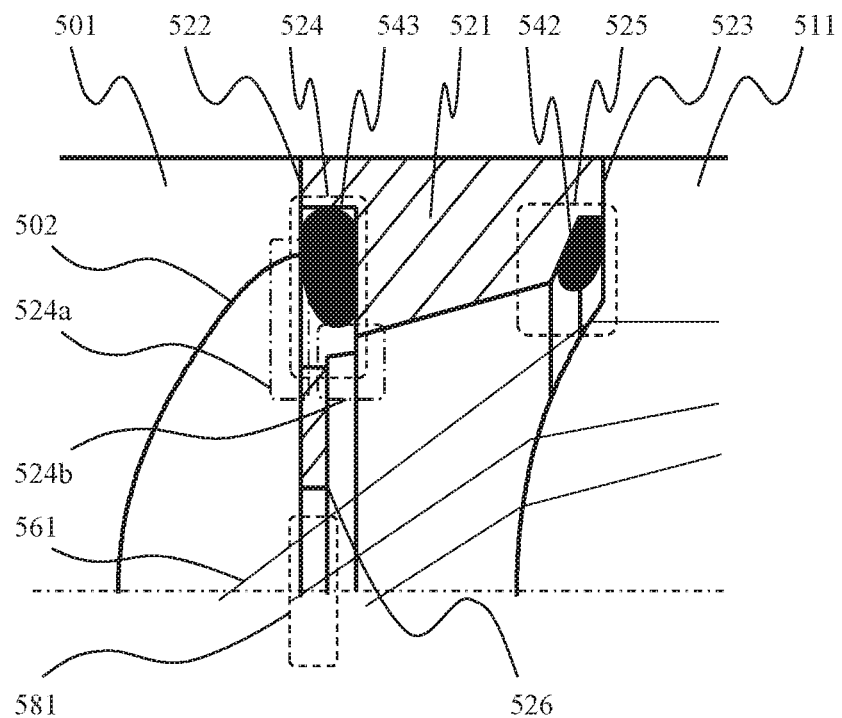
FIGS. 16A and 16B are each a partial sectional view for illustrating structures of contact portions and bonding portions of the optical system according to the present invention.
Figure 16:
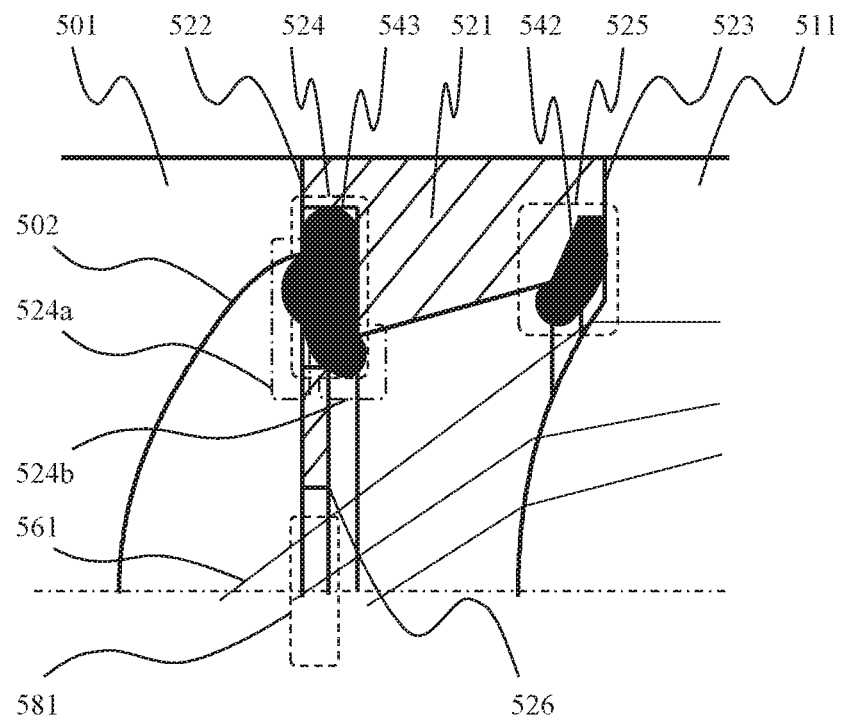

First, a structure of the adhesive reservoir 524 is described. FIG. 16A is an enlarged view of contact portions 522 and 523 and bonding portions at the spacer 521. The adhesive reservoir 524 formed at the spacer 521 has two portions that open into a space through which a light beam 561 passes. As in the adhesive reservoir 324 formed at the spacer 321 of the optical system 300, one of the portions is an open portion 524a that opens in the direction of an optical surface 502 of the first lens 501. The other portion is an open portion 524b that opens into an interior of the spacer 521. The procedures for bringing the first lens 501 and the spacer 521 into contact with each other and bonding the first lens 501 and the spacer 521 to each other may be the same as those described in the fifth embodiment.

Next, advantages of the adhesive reservoir 524 are described. FIG. 16A shows a state in which a proper amount of adhesive 541 and a proper amount of adhesive 542 are applied, whereas FIG. 16B shows a state in which an excessive amount of adhesive 543 and an excessive amount of adhesive 544 are accidentally applied. Since the excessively applied adhesive 543 is compressed in the process of bringing the first lens 501 and the spacer 521 into contact with each other, the adhesive 543 tries to spread into the vicinity from where the adhesive 543 has been applied.

In the present invention, the adhesive reservoir 524 not only opens in the direction of the optical surface 502 of the first lens 501, but also opens into the interior of the spacer 521. Therefore, the adhesive 543 not only tends to spread in the direction of the optical surface 502, but also tends to spread in the direction of the interior of the spacer 521. Consequently, the excessively applied adhesive 543 further actively spreads to an inner side of the adhesive reservoir 524. As a result, the adhesive 543 is less likely to spread beyond and outwardly from the contact portion 522 formed at an outer side of the adhesive reservoir 524.

As mentioned above, in the optical system 300 and the optical system 500 according to the present invention, the excessively applied adhesive 343 and the excessively applied adhesive 543 actively spread in the direction of the light beam 361 and the direction of the light beam 561, respectively. Therefore, it is possible to prevent the adhesives 343 and 543 from spreading outwardly from the respective adhesive reservoirs 324 and 524 and protruding outwardly from the respective first lenses 301 and 501 and the respective spacers 321 and 521.

Similarly, the excessively applied adhesive 344 and the excessively applied adhesive 544 actively spread in the direction of the light beam 361 and the direction of the light beam 561, respectively. Therefore, it is possible to prevent the adhesives 344 and 544 from spreading outwardly from the respective adhesive reservoirs 325 and 525 and from protruding outwardly from the respective second lenses 311 and 511 and the respective spacers 321 and 521.

In particular, the adhesive reservoir 324 is formed in substantially the same plane as the pupil 381 for the light beam 361 of the optical system 300 and the adhesive reservoir 524 is formed in substantially the same plane as a pupil 581 for the light beam 561 of the optical system 500. The outside diameter of the light beam 361 is smallest at the position of the pupil 381, and the outside diameter of the light beam 561 is smallest at the position of the pupil 581. The pupil 381 or 581 is the location where there is an air or vacuum space in the optical system. Therefore, by forming the pupil 381 and the adhesive reservoir 324 in substantially the same plane, and by forming the pupil 581 and the adhesive reservoir 524 in substantially the same plane, it is possible to reduce the possibility with which the adhesive 343 that has spread inwardly from the adhesive reservoir 324 obstructs the light beam 361 and to reduce the possibility with which the adhesive 543 that has spread inwardly from the adhesive reservoir 524 obstructs the light beam 561, respectively.

In the optical system 300 according to the sixth embodiment, an optical surface 302 of the first lens 301 opposing the pupil 381 is a concave surface. In the optical system 500 according to the modification, an optical surface 502 of the first lens 501 opposing the pupil 581 is a concave surface. Therefore, compared to the case in which the optical surfaces 302 and 502 are convex surfaces, a space between the surface where the adhesive reservoir 324 is formed and the optical surface 302 and a space between the surface where the adhesive reservoir 524 is formed and the optical surface 502 become wider. Therefore, it is possible to reduce the possibility with which the adhesive 343 that has spread inwardly from the adhesive reservoir 324 obstructs the light beam 361 and to reduce the possibility with which the adhesive 543 that has spread inwardly from the adhesive reservoir 524 obstructs the light beam 561.

Due to the aforementioned advantages, the possibility with which the outside diameter of the optical system 300 is increased as a result of the adhesive 323 protruding outwardly from the spacer 321 and the image pickup sensor 331 and the adhesive 324 protruding outwardly from the first lens 301 and the spacer 321 is low. In addition, the possibility with which the outside diameter of the optical system 500 is increased as a result of the adhesive 523 protruding outwardly from the spacer 521 and the image pickup sensor 531 and the adhesive 524 protruding outwardly from the first lens 501 and the spacer 521 is low. Further, the possibility with which undesired bonding occurs as a result of the outwardly protruded adhesives 323 and 324 coming into contact with members disposed outside of the optical system 300 is low. In addition, the possibility with which undesired bonding occurs as a result of the outwardly protruded adhesives 523 and 524 coming into contact with members disposed outside of the optical system 500 is low. Therefore, the optical systems 300 and 500 according to the present invention make it possible to increase the precision of the amounts of applications of the adhesives and the allowable ranges of variations in the amounts of applications of the adhesives, and to reduce required processing and assembly costs.

In the embodiment, as examples of the most advantageous structure according to the present invention, the example in which the adhesive reservoir 324 is formed in substantially the same plane as the pupil 381 and the example in which the adhesive reservoir 524 is formed in substantially the same plane as the pupil 581 are described. However, even if the position where the adhesive reservoir 324 is formed is situated near the pupil 381 and the position where the adhesive reservoir 524 is formed is situated near the pupil 581, the advantages of the present invention can be provided. The adhesive reservoir 324 is desirably formed at the spacer 321 with which the aperture stop 326 is integrated and the adhesive reservoir 524 is desirably formed at the spacer 521 with which the aperture stop 526 is integrated.

Seventh Embodiment

In a seventh embodiment, a structure of a spacer integrated with an aperture stop is formed into an inside tapering structure in which the diameter of an opening portion is smallest, so that bending strength at the aperture stop is increased to make it possible to reduce displacement and deformation of the aperture stop caused by compression of adhesives.

Figure 17:
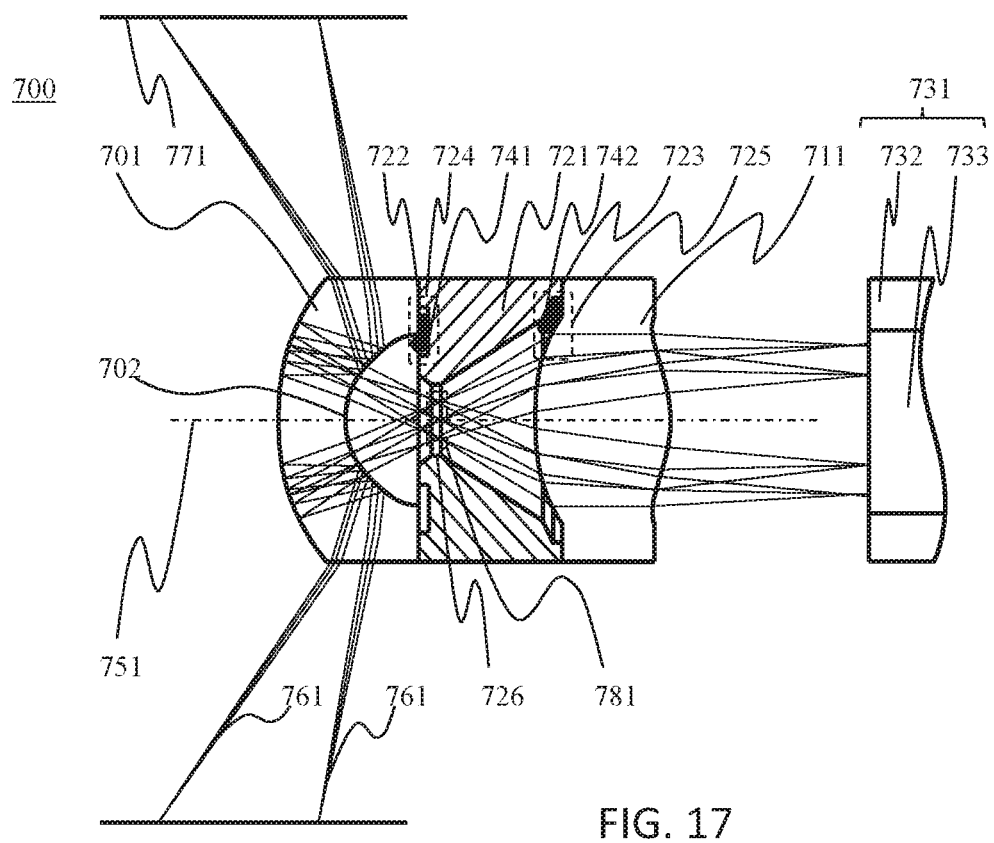
FIG. 17 is a sectional view for illustrating a structure of an optical system according to the present invention.

FIG. 17 is a sectional view of an optical system 700 according to the present invention. First, the structure of the optical system 700 is described with reference to FIG. 17. The optical system 700 includes a first lens 701, a second lens 711, a spacer 721, and an image pickup fiber 731, which are coaxially disposed. The image pickup fiber 731 includes a fiber holding unit 732 and a fiber unit 733.

The first lens 701 and the second lens 711 optically function to allow an annular object surface 771 and an end face of the fiber unit 733 of the image pickup fiber 731 to be positioned at a conjugate position. That is, an image of an annular object that is positioned close to the annular object surface 771 is focused on the end face of the fiber unit 733 of the image pickup fiber 731.

The first lens 701 and the second lens 711 are both in contact with the spacer 721 and are both secured thereto with adhesives. The spacer 721 includes contact portions 722 and 723 and adhesive reservoirs 724 and 725. The first lens 701 is in contact with the contact portion 722, and is secured to the spacer 721 by an adhesive 741 applied to the adhesive reservoir 724. Similarly, the second lens 711 is in contact with the contact portion 723, and is secured to the spacer 721 by an adhesive 742 applied to the adhesive reservoir 725.

The procedures for bringing the first lens 701 and the spacer 721 into contact with each other and bonding the first lens 701 and the spacer 721 to each other, and the procedures for bringing the second lens 711 and the spacer 721 into contact with each other and bonding the second lens 711 and the spacer 721 to each other may be the same as those described in the fifth embodiment.

An aperture stop 726 is formed near a surface where the adhesive reservoir 724 is formed. The structure of the vicinity of the aperture stop 726 is a tapering structure in which the diameter of an opening portion of the aperture stop 726 is smallest. A pupil 781 for a light beam 761 of the optical system 700 is formed at a position that substantially corresponds with the position of the opening portion of the aperture stop 726.

In this way, by integrating the aperture stop 726 with the spacer 721, compared to a case in which they are separately formed, it is possible to reduce the number of component parts, the number of causes of assembly error, etc.

Next, advantages of the optical system 700 are described. Advantages of the optical system 700 that are common to those of the optical system 300 are as follows. In the optical system 700, the adhesive reservoir 724 is formed inwardly of the contact portion 722, and the adhesive reservoir 725 is formed inwardly of the contact portion 723. In addition, the adhesive reservoirs 724 and 725 open into a space through which the light beam 761 passes. Therefore, it is possible to allow the excessively applied adhesives 741 and 742 to actively spread inward, and to prevent them from spreading and protruding outward.

Further, since the adhesive reservoir 724 is formed close to the pupil where the outside diameter of the light beam 761 is smallest, it is possible to reduce the possibility with which the inwardly spread adhesive 741 obstructs the light beam 761.

Since an optical surface 702 of the first lens 701 opposing the pupil 781 is a concave surface, the space between the optical surface 702 and the adhesive reservoir 724 is wide. Therefore, it is possible to reduce the possibility with which the inwardly spread adhesive 724 obstructs the light beam 761. Here, the terms "inwardly" and "inward" refer to a direction approaching an optical axis, and the term "outward" refers to a direction away from the optical axis.

In the description below, the terms "outwardly", "outward", and "outer side" refer to a direction away from the optical axis, and the terms "inwardly" and "inward" refer to a direction approaching the optical axis.

Advantages that are characteristic of the optical system 700 are mentioned below. In the optical system 700, the structure of the vicinity of the aperture stop 726 is a tapering structure. Therefore, compared to a structure in which a pinhole is formed in a thin-walled plate, which is generally used as an aperture stop, flexural rigidity is high, as a result of which the optical system 700 is less likely to be flexed. Consequently, even if a force acts upon the vicinity of the aperture stop 726 due to the influence of, for example, compression of the adhesives 741 and 742 when they are cured, deformation and positional displacement are less likely to occur.

Due to the aforementioned advantages, the possibility with which the outside diameter of the optical system 700 is increased as a result of the adhesive 741 protruding outwardly from the first lens 701 and the spacer 721 and the adhesive 742 protruding outwardly from the spacer 721 and the image pickup sensor 731 is low. Further, the possibility with which undesired bonding occurs as a result of the outwardly protruded adhesives 741 and 742 coming into contact with members disposed outside of the optical system 700 is low. Therefore, the optical system 700 according to the present invention makes it possible to increase the precision of the amounts of applications of the adhesives and allowable ranges of variations in the amounts of applications of the adhesives, and to reduce required processing and assembly costs.

Since it is less likely for displacements and deformations of the vicinity of the aperture stop 726 caused by compression of the adhesives 741 and 742 to occur, it is possible to reduce the rate of occurrence of defective products produced by the assembly process.

Eighth Embodiment

In an eighth embodiment, a case in which, when an optical system having the advantages provided by the fifth embodiment to the seventh embodiment is slid relative to an inner portion of a cylindrical accommodation member, the occurrence of improper sliding of the optical system caused by protrusion of an adhesive can be reduced is described.

Figure 18:
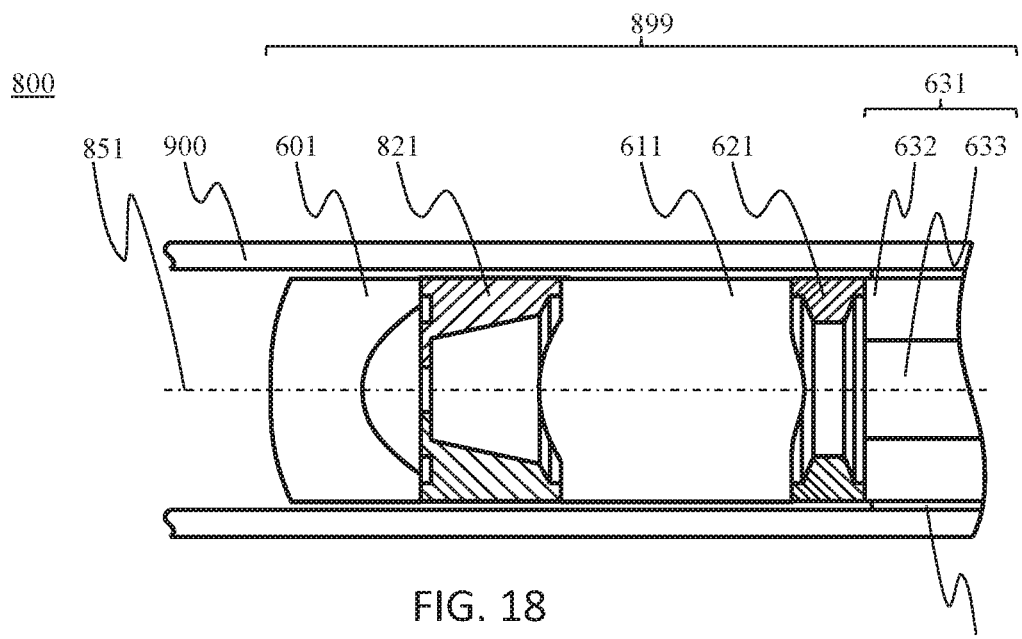
FIG. 18 is a sectional view for illustrating an optical unit according to the present invention.

FIG. 18 is a sectional view of an optical unit 800 according to the present invention. In addition to the structure of the optical system 600 described in the fifth embodiment, the optical unit 800 has a structure in which a spacer 821 is disposed between a first lens 601 and a second lens 611.

Therefore, in describing the optical unit 800, numbers added to the structural elements of the optical system 600 described in the fifth embodiment are used, and descriptions of structural elements that correspond to those of the optical unit 600 are not given.

First, a structure of the optical unit 800 is described with reference to FIG. 18. In the optical unit 800, the first lens 601 and the second lens 611 are both in contact with the spacer 821 and are both secured thereto with adhesives. The spacer 821 has the same structure as the spacer 321 of the optical unit 300 described in the sixth embodiment, and has the same advantages as the spacer 321. Therefore, the spacer 821 is not described below.

The procedures for bringing the first lens 601 and the spacer 821 into contact with each other and bonding the first lens 601 and the spacer 821 to each other, and the procedures for bringing the second lens 611 and the spacer 821 into contact with each other and bonding the second lens 611 and the spacer 821 to each other may be the same as those described in the fifth embodiment.

In the description below, an optical system including the first lens 601, the second lens 611, the spacers 621 and 821, and the image pickup fiber 631 is called an optical system 899.

The fiber holding unit 632 of the image pickup fiber 631 is connected to a cylindrical drive shaft 891. When the drive shaft 891 is moved in a direction parallel to an optical axis 851, the fiber holding unit 632 also moves together with the drive shaft 891. Since the structural elements of the optical system 899 are connected to each other, as the drive shaft 891 moves, the optical system 899 also moves together therewith.

The optical system 899 may be accommodated in a cylindrical accommodation member 900. A predetermined clearance is provided between the optical system 899 and the accommodation member 900. Thus, the drive shaft allows the optical system to move in the direction parallel to the optical axis and relative to the accommodation member.

Next, advantages of the optical unit 800 are described. As mentioned above, in addition to the structure of the optical system 600, the optical unit 800 includes the spacer 821 having the same advantages as the spacer 321 of the optical unit 300. Therefore, the optical unit 800 provides the same advantages as the optical units 600 and 300.

That is, in the optical unit 800, the possibility with which the outside diameter of the optical system 899 is increased as a result of the adhesives protruding outwardly from the optical system 899 is low. Therefore, the possibility with which undesired bonding occurs as a result of the outwardly protruded adhesives coming into contact with the accommodation member 900 disposed outside of the optical system 899 is low. Here, the term "outwardly" refers to a direction away from the optical axis.

Therefore, when the drive shaft 891 is moved in a direction parallel to the optical axis 851 and the optical system 899 is moved in the direction parallel to the optical axis 851, the possibility with which undesired adhesive protrudes from a sliding portion between the optical system 899 and the accommodation member 900 and hinders the optical system 899 and the accommodation member 900 from sliding relative to each other is low.

When the optical unit 800 according to the present invention is used as an end portion of an endoscope, moving the drive shaft 891 in a direction parallel to the optical axis while the optical unit 800 is disposed in a predetermined observation position makes it possible to observe an object while gradually changing the observation position.

By replacing the optical system 899 with an optical system that is suitable for OCT or IVUS, it is possible to acquire OCT or IVUS information while gradually changing the observation position.

According to the fifth embodiment, since adhesive reservoirs are formed inwardly from contact portions and open into a space through which a light beam passes, it is possible to allow excessively applied adhesives to actively spread inward, and to prevent them from protruding outward. Further, since an adhesive reservoir is formed close to a surface where the outside diameter of the light beam is smallest, it is possible to reduce the possibility with which inwardly spread adhesives obstruct the light beam.

According to the sixth embodiment, as with the fifth embodiment, it is possible to allow excessively applied adhesives to actively spread inward and to prevent them from spreading and protruding outward. In addition, since an adhesive reservoir is formed close to a surface where the outside diameter of a light beam is smallest, it is possible to reduce the possibility with which inwardly spread adhesives obstruct the light beam. Further, by integrating a spacer and an aperture stop with each other, it is possible to reduce the number of component parts, the number of causes of assembly error, etc. Still further, by forming an adhesive reservoir and a pupil in substantially the same plane, it is possible to apply an adhesive to a surface of the pupil where the outside diameter of the light beam is smallest, so that it is possible to reduce the possibility with which the inwardly spread adhesives obstruct the light beam. Still further, since an optical surface of a first lens opposing the pupil is a concave surface, a space between the optical surface and a bonding portion of the surface becomes wide, so that it is possible to reduce the possibility with which the inwardly spread adhesives obstruct the light beam.

According to the seventh embodiment, as with the fifth embodiment, it is possible to allow excessively applied adhesives to actively spread inward, and to prevent them from spreading and protruding outward. Further, as with the sixth embodiment, since an adhesive reservoir is formed near a pupil where the outside diameter of a light beam is smallest, it is possible to reduce the possibility with which inwardly spread adhesives obstruct the light beam. Further, by forming the structure of a spacer with which an aperture stop is integrated into an inside tapering structure in which the diameter of an opening portion is smallest, it possible to reduce displacement and deformation of the aperture stop caused by the compression of adhesives.

According to the eighth embodiment, since adhesives are prevented from protruding into a sliding portion between an accommodation member and an optical system, it is possible to provide an optical system in which the occurrence of improper sliding caused by protrusion of the adhesives is reduced.

Applications

A specific application for the endoscopic apparatus as presently described is laser speckle imaging. This method is described in U.S. Pat. Pub. 2014/0378846, which is herein incorporated by reference in its entirety. In some embodiments, the omnidirectional reflector can be used as part of the illuminating optical system as described herein. A second specific application for the endoscopic apparatus as presently described is as an industrial endoscope. For example, the device can be used in the aerospace industry such as for a jet engine for internal inspection of areas that are most susceptible to wear and fatigue; the device can also be used, for example, in security system; in an automobile or marine engine; in a chemical, petrochemical, or power plant; or in the food industry.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An apparatus comprising:
an imaging optical system configured to image a side surface in a tubular passage comprising:
a first optical group including an optical device, the optical device includes at least two rotationally symmetric reflecting surfaces and one transmitting surface interposed between the two rotationally symmetric reflecting surfaces,
an illuminating optical system, comprising:
at least one reflecting element configured to transmit illuminating light toward a portion of the side surface of the tubular passage,
wherein the illuminating optical system is arranged centrally within the imaging optical system, and an axis of rotational symmetry of the reflecting element matches a center axis of the rotational symmetric reflecting surfaces, the illuminating light passes through the center axis of the rotational symmetric reflecting surfaces before the illuminating light is transferred by the reflecting element.

2. The apparatus according to claim 1, wherein the at least one reflecting element is a reflecting illumination plane having an odd-order aspherical shape.

3. The apparatus according to claim 1, wherein the rotationally symmetric reflecting surfaces are adapted to transmit light only through a ring-shaped portion rotationally symmetric reflecting surfaces or wherein the rotationally symmetric reflecting surfaces are ring-shaped.

4. The apparatus according to claim 1, wherein the equation $0.2<T/L<0.8$ is satisfied, wherein T is the thickness of the thickest lens included in the second optical group, and L is the entire length of the imaging optical system.

5. The apparatus according to claim 1, wherein the first optical group has a negative refracting power.

6. The apparatus according to claim 5, further comprising a second optical group having a positive refracting power, and an imaging plane.

7. The apparatus according to claim 6, wherein the second optical group consists of one lens.

8. The apparatus according to claim 1, further comprising a fiber bundle for image transmission positioned to receive light from the imaging plane.

9. The apparatus according to claim 8, wherein the illuminating optical system comprises an optical fiber that is formed integrally with the fiber bundle.

10. The apparatus according to claim 1, further comprising an imaging element arranged on the imaging plane.

11. The apparatus according to claim 10, wherein the illuminating optical system further comprising:
an illumination fiber, wherein a hole is located at a center of the imaging element, and the illumination fiber is arranged in the hole.

12. The apparatus according to claim 1, wherein the optical device includes a hole which allows passage of the illuminating light through the center thereof.

13. The apparatus according to claim 1, wherein the apparatus is a medical endoscope designed for in vivo use or is an industrial endoscope.

14. An endoscopic apparatus for analyzing at least one anatomical structure, comprising:
an imaging optical system configured to image a side surface in a tubular passage comprising:
a first optical group having a negative refracting power and including an optical device, the optical device includes at least two rotationally symmetric reflecting surfaces and one transmitting surface interposed between the two rotationally symmetric reflecting surfaces,
a second optical group having a positive refracting power, and
an imaging plane and
an illuminating optical system comprising:
at least one reflecting element configured to transmit illuminating light toward a portion of the side surface of the tubular passage,
wherein the illuminating optical system is arranged centrally within the imaging optical system, and an axis of rotational symmetry of the reflecting element matches a center axis of the rotational symmetric reflecting surfaces, the illuminating light passes through the center axis of the rotational symmetric reflecting surfaces before the illuminating light is transferred by the reflecting element.

\* \* \* \* \*